(12) United States Patent
Deshmukh et al.

(10) Patent No.: US 10,853,903 B1
(45) Date of Patent: Dec. 1, 2020

(54) DETECTION OF ENCODED SIGNALS AND ICONS

(71) Applicant: Digimarc Corporation, Beaverton, OR (US)

(72) Inventors: Utkarsh Deshmukh, Hillsboro, OR (US); Eliot Rogers, Beaverton, OR (US); Matthew M. Weaver, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 71 days.

(21) Appl. No.: 15/960,408

(22) Filed: Apr. 23, 2018

Related U.S. Application Data

(63) Continuation-in-part of application No. 15/448,403, filed on Mar. 2, 2017, now abandoned.

(Continued)

(51) Int. Cl.
*H04N 1/32* (2006.01)
*G06T 1/00* (2006.01)

(52) U.S. Cl.
CPC .......... *G06T 1/0071* (2013.01); *G06T 1/0028* (2013.01); *G06T 1/0064* (2013.01);
(Continued)

(58) Field of Classification Search
CPC .. G06K 7/10; G06K 7/10861; G06K 7/10851; G06K 7/14; G06K 17/0022; G06K 7/10871; G06K 7/10881; G06K 7/10891; G06K 7/109; G06K 19/04; G06K 19/041; G06K 19/06037; G06K 19/06046; G06K 19/14; G06K 7/1417; G06K 7/1447; G06K 19/06028; G06K 7/1413; H04N 1/32288; H04N 2201/327; H04N 2201/3233; H04N 1/32144; H04N 2005/91335;
(Continued)

(56) References Cited

U.S. PATENT DOCUMENTS 4,628,532 A  12/1986 Stone
4,874,936 A * 10/1989 Chandler ............. G06K 7/1093
235/494
(Continued)

FOREIGN PATENT DOCUMENTS

WO   2012004626   1/2012
WO   2012156774   11/2012
WO   2017011801   1/2017

OTHER PUBLICATIONS

"Vision Based Modeling and Localization for Planetary Exploration Rovers," Proc. of Int. Astronautical Congress (IAC), Oct., 2004. 11 pages.
(Continued)

*Primary Examiner* — Andrew M Moyer
*Assistant Examiner* — Dennis Rosario
(74) *Attorney, Agent, or Firm* — Digimarc Corporation

(57) ABSTRACT

The present disclosure relates to signal decoding and icon (e.g., a logo, shape, icon, etc.) detection. In some implementations, a first response is provided upon signal decoding but no icon detection within first captured image data, and a second response is provided upon signal decoding and icon detection within the first captured image data. Other aspects, combinations and implementations are described as well.

18 Claims, 22 Drawing Sheets

Related U.S. Application Data

(60) Provisional application No. 62/488,661, filed on Apr. 21, 2017, provisional application No. 62/429,539, filed on Dec. 2, 2016, provisional application No. 62/405,709, filed on Oct. 7, 2016, provisional application No. 62/400,083, filed on Sep. 26, 2016.

(52) U.S. Cl.
CPC . *H04N 1/32144* (2013.01); *G06T 2201/0065* (2013.01); *G06T 2201/0202* (2013.01)

(58) Field of Classification Search
CPC ............ G11B 20/00884; G07D 7/0034; G06T 1/005; G06T 2201/0052; G06T 1/0064; G06T 1/0057; G06T 2201/0065; G06T 1/0028; G06T 1/0021; G06T 2201/0064; G06T 2201/0083; G06T 2201/0081; G06T 2201/0601; G06T 2201/0051; G06T 2201/0053; G06T 2201/0061

See application file for complete search history.

(56) References Cited

U.S. PATENT DOCUMENTS

| | | | |
|---|---|---|---|
| 5,862,260 | A | 1/1999 | Rhoads |
| 6,102,403 | A | 8/2000 | Kaufman |
| 6,122,403 | A | 9/2000 | Rhoads |
| 6,249,603 | B1 | 6/2001 | Rucklidge |
| 6,311,214 | B1 | 10/2001 | Rhoads |
| 6,427,020 | B1 | 7/2002 | Rhoads |
| 6,614,914 | B1 | 9/2003 | Rhoads |
| 6,625,297 | B1 | 9/2003 | Bradley |
| 6,655,595 | B1 * | 12/2003 | Longacre, Jr. ........... G06K 7/14 235/462.08 |
| 6,674,876 | B1 | 1/2004 | Hannigan |
| 6,711,293 | B1 | 3/2004 | Lowe |
| 6,988,202 | B1 | 1/2006 | Rhoads |
| 7,072,490 | B2 | 7/2006 | Stach |
| 7,076,082 | B2 | 7/2006 | Sharma |
| 7,197,160 | B2 | 3/2007 | Rhoads |
| 7,352,878 | B2 | 4/2008 | Reed |
| 7,359,563 | B1 | 4/2008 | Dua |
| 7,412,072 | B2 | 8/2008 | Sharma |
| 7,734,506 | B2 | 6/2010 | Ouchi |
| 7,986,807 | B2 | 7/2011 | Stach |
| 7,991,182 | B2 | 8/2011 | Rhoads |
| 8,355,525 | B2 | 1/2013 | Mckinley |
| 8,990,638 | B1 | 3/2015 | Robichaud |
| 9,117,268 | B2 | 8/2015 | Reed |
| 9,182,778 | B2 | 11/2015 | Sharma |
| 9,224,184 | B2 | 12/2015 | Bai |
| 9,245,308 | B2 | 1/2016 | Reed |
| 9,380,186 | B2 | 6/2016 | Reed |
| 9,401,001 | B2 | 7/2016 | Reed |
| 9,449,357 | B1 | 9/2016 | Lyons |
| 9,466,009 | B2 | 10/2016 | Jaber |
| 9,516,001 | B2 * | 12/2016 | Borland ............ H04L 63/0457 |
| 9,521,291 | B2 | 12/2016 | Holub |
| 9,582,844 | B2 | 2/2017 | Reed |
| 9,667,829 | B2 | 5/2017 | Bai |
| 9,805,435 | B2 | 10/2017 | Reed |
| 9,959,587 | B2 | 5/2018 | Sharma |
| 10,019,646 | B2 * | 7/2018 | Voloshynovskiy ........... G06K 9/00577 |
| 10,540,564 | B2 | 1/2020 | Wilbert |
| 2004/0262393 | A1 * | 12/2004 | Hara ................ G06K 7/10851 235/462.14 |
| 2004/0263911 | A1 | 12/2004 | Rodriguez |
| 2006/0104598 | A1 | 5/2006 | Gilles |
| 2006/0157574 | A1 | 7/2006 | Farrar |
| 2006/0165311 | A1 | 7/2006 | Watson |
| 2007/0080963 | A1 | 4/2007 | Christophe |
| 2009/0206161 | A1 | 8/2009 | Olmstead |
| 2009/0282025 | A1 | 11/2009 | Winter |
| 2010/0299332 | A1 | 11/2010 | Dassas |
| 2011/0161076 | A1 | 6/2011 | Davis |
| 2011/0212717 | A1 | 9/2011 | Rhoads |
| 2011/0321082 | A1 | 12/2011 | Weerasinghe |
| 2012/0078989 | A1 | 3/2012 | Sharma |
| 2012/0284012 | A1 | 11/2012 | Rodriguez |
| 2013/0206839 | A1 | 8/2013 | Gao |
| 2013/0223673 | A1 * | 8/2013 | Davis ................ G06K 9/78 382/100 |
| 2013/0329006 | A1 | 12/2013 | Boles |
| 2014/0105450 | A1 | 4/2014 | Berkeley |
| 2014/0292817 | A1 | 10/2014 | Iversen |
| 2015/0016712 | A1 | 1/2015 | Rhoads |
| 2015/0154724 | A1 * | 6/2015 | Alattar ............ G06K 9/00744 382/100 |
| 2016/0187199 | A1 | 6/2016 | Brunk |
| 2016/0189326 | A1 | 6/2016 | Rodriguez |
| 2016/0198064 | A1 | 7/2016 | Bai |
| 2016/0217547 | A1 | 7/2016 | Stach |
| 2016/0275326 | A1 | 9/2016 | Falkenstern |
| 2016/0275639 | A1 | 9/2016 | Holub |
| 2016/0316098 | A1 | 10/2016 | Reed |
| 2016/0364623 | A1 | 12/2016 | Evans |
| 2017/0004597 | A1 | 1/2017 | Boles |
| 2017/0024840 | A1 | 1/2017 | Holub |
| 2017/0193628 | A1 | 7/2017 | Sharma |
| 2017/0372449 | A1 | 12/2017 | Yarvis |
| 2018/0047126 | A1 | 2/2018 | Falkenstern |
| 2018/0047127 | A1 | 2/2018 | Falkenstern |
| 2019/0070064 | A1 | 3/2019 | Hogle |

OTHER PUBLICATIONS

Bay et al, SURF: Speeded Up Robust Features, Eur. Conf. on Computer Vision (1), pp. 404-417, 2006.

Bonato et al, "Parallel Hardware Architecture for Scale and Rotation Invariant Feature Detection," IEEE Trans on Circuits and Systems for Video Tech, vol. 18, No. 12, 2008. 11 pages.

Chen et al, "Efficient Extraction of Robust Image Features on Mobile Devices," Proc. of the 6.sup.th IEEE. 2 pages.

David Lowe, "Distinctive Image Features from Scale-Invariant Keypoints," International Journal of Computer Vision, 60, 2 (2004), pp. 91-110.

David Lowe, "Object Recognition from Local Scale-Invariant Features," International Conference on Computer Vision, Corfu, Greece (Sep. 1999), pp. 1150-1157.

Dillencourt et al., "A general approach to connected-component labeling for arbitrary image representations," Journal of the ACM. J. ACM. 39 (2): 253-280 (1992).

Ethan Rublee, Vincent Rabaud, Kurt Konolige, Gary Bradski "Orb: an efficient alternative to SIFT or SURF", Computer Vision (ICCV), 2011 IEEE International Conference on. IEEE, 2011. 8 pages.

Fei-Fei et al, A Bayesian Hierarchical Model for Learning Natural Scene Categories, IEEE Conference on Computer Vision and Pattern Recognition, 2005. 8 pages.

Gao et al. "An improved Sobel edge detection." Computer Science and Information Technology (ICCSIT), 2010 3rd IEEE International Conference on. vol. 5. IEEE, 2010. 5 pages.

Hu, M.K.: Visual Pattern Recognition by Moment Invariants. IRE Trans. Inform. Theory 1(8) (Feb. 1962) 179-187.

J. Canny (1986) "A computational approach to edge detection", IEEE Trans. Pattern Analysis and Machine Intelligence, vol. 8, pp. 679-714.

J.L. Rodgers, J. L. and W.A. Nicewander, "Thirteen Ways to Look at the Correlation Coefficient", American Statistician 42, 59-66 (1995).

Jan Flusser, TomášSuk and Barbara Zitová, "Moments and Moment Invariants in Pattern Recognition," 2009 John Wiley & Sons, Ltd. ISBN: 978-0-470-69987-4. 303 pages.

Lian, et al, Visual similarity based 3D shape retrieval using bag-of-features, IEEE Shape Modeling International Conference 2010. 12 pages.

Mikolajczyk et al, "Performance Evaluation of Local Descriptors," IEEE Trans. Pattern Anal. Mach. Intell., vol. 27, No. 10, pp. 1615-1630, 2005.

(56) References Cited

OTHER PUBLICATIONS

Neven et al, "Image Recognition with an Adiabatic Quantum Computer I. Mapping to Quadratic Unconstrained Binary Optimization," Arxiv preprint arXiv:0804.4457, 2008. 7 pages.
Nobuyuki Otsu (1979), "A threshold selection method from gray-level histograms," IEEE Trans. Sys., Man., Cyber. 9 (1): 62-66.
Nowak, et al., "Sampling strategies for bag-of-features image classification," Computer Vision—ECCV 2006, Springer Berlin Heidelberg, pp. 490-503.
O'Rourke, Joseph (1985), "Finding minimal enclosing boxes", International Journal of Computer and Information Sciences, 14 (3): 183-199.
Ohbuchi, et al, Accelerating bag-of-features Sift algorithm for 3d model retrieval, Proc. SAMT 2008 Workshop on Semantic 3D Media. 8 pages.
Ohbuchi, et al, Distance Metric Learning and Feature Combination for Shape-Based 3D Model Retrieval, Poster Presentation, Proc. of the ACM workshop on 3D Object Retrieval, 2010. 6 pages.
Paris, et al., "A gentle introduction to bilateral filtering and its applications," Proceedings of SIGGRAPH '08 ACM SIGGRAPH, article No. 1, Aug. 11, 2008. 50 pages.
Pulli, Kari; Baksheev, Anatoly; Kornyakov, Kirill; Eruhimov, Victor, "Realtime Computer Vision with OpenCV" (2012) ACM 1542-7730, pp. 1-17.
R. Deriche (1987) Using Canny's criteria to derive an optimal edge detector recursively implemented, Int. J. Computer Vision, vol. 1, pp. 167-187.
Se et al, "Vision Based Modeling and Localization for Planetary Exploration Rovers," Proc. of Int. Astronautical Congress (IAC), Oct. 2004. 11 pages.
Sylvain Fischer, Rafael Redondo, Laurent Perrinet, Gabriel Cristobal, "Sparse approximation of images inspired from the functional architecture of the primary visual areas," EURASIP Journal on Advances in Signal Processing, special issue on Image Perception, 2007. 16 pages.
Takacs et al, "Outdoors Augmented Reality on Mobile Phone Using Loxel-Based Visual Feature Organization," ACM Int. Conf. on Multimedia Information Retrieval, Oct. 2008. 8 pages.
The OpenCV Reference Manual, Release 3.0.0-dev, Jun. 25, 2014, pp. 1-899.
U.S. Appl. No. 62/488,661, filed Apr. 21, 2017. (113 pages).
U.S. Appl. No. 15/441,006, filed Feb. 23, 2017.
U.S. Appl. No. 15/448,403, filed Mar. 2, 2017. (114 pages).
U.S. Appl. No. 15/960,408, filed Apr. 23, 2018. (112 pages).
U.S. Appl. No. 16/056,071, filed Aug. 6, 2018. (136 pages).
U.S. Appl. No. 15/967,390, filed Apr. 30, 2018. (119 pages).
U.S. Appl. No. 16/058,780, filed Aug. 8, 2018. (140 pages).
U.S. Appl. No. 15/628,400, filed Jun. 20, 2017. (74 pages).
U.S. Appl. No. 15/588,451, filed May 5, 2017. (65 pages).
Andrew, "Another efficient algorithm for convex hulls in two dimensions," Information Processing Letters, vol. 9, Issue 5, Dec. 16, 1979, pp. 216-219.
Aurenhammer, Franz. "Voronoi diagrams—a survey of a fundamental geometric data structure." ACM Computing Surveys (CSUR) 23.3 (1991): 345-405.
Kato et al., Pervasive 2D Barcodes for Camera Phone Applications, Oct.-Dec. 2007 [retrieved Jan. 2, 2020], IEEE Pervasive Computing, vol. 6, Issue:4, pp. 76-85. Retrieved: https://ieeexplore.ieee.org/abstract/docunnent/4343902 (Year: 2007).
Rekimoto et al., CyberCode: Designing Augmented Reality Environments with Visual Tags, Proceedings of DARE 2000 on Designing Augmented Reality Environments, Apr. 2000 [retrieved Jan 2, 2020], pp. 1-10. Retrieved: https://dLacnn.org/doi/10.1145/354666.354667 (Year: 2000).

* cited by examiner

Fig. 15
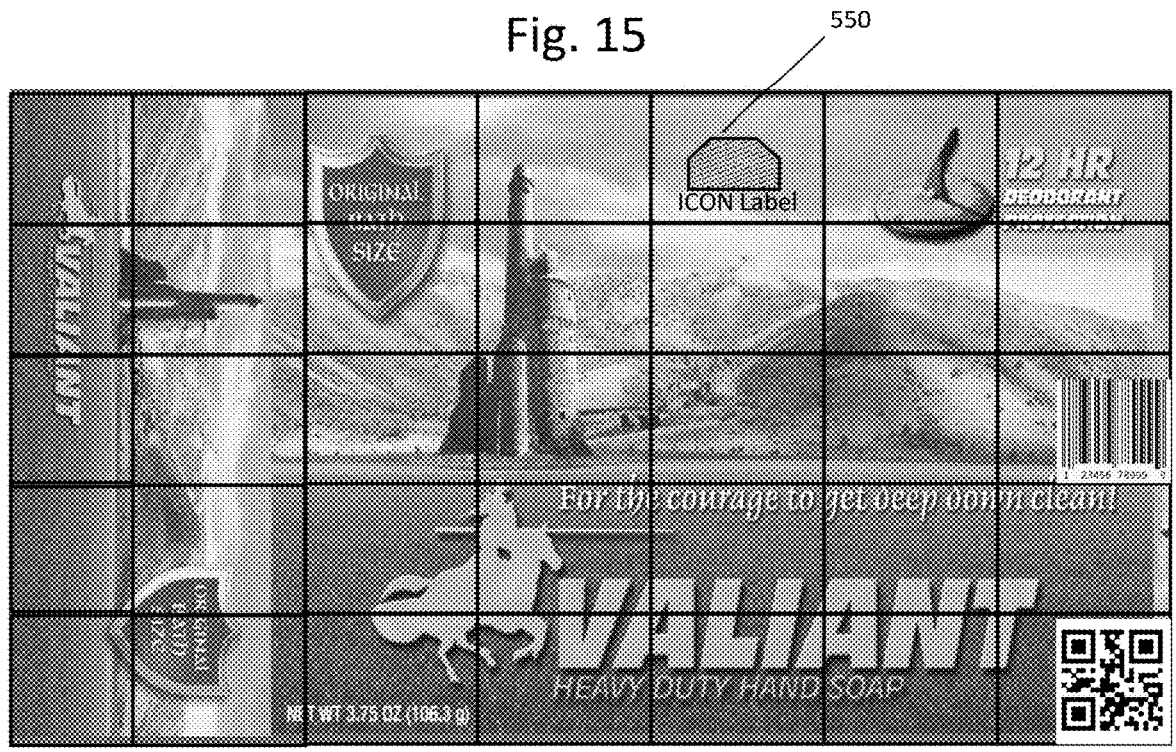
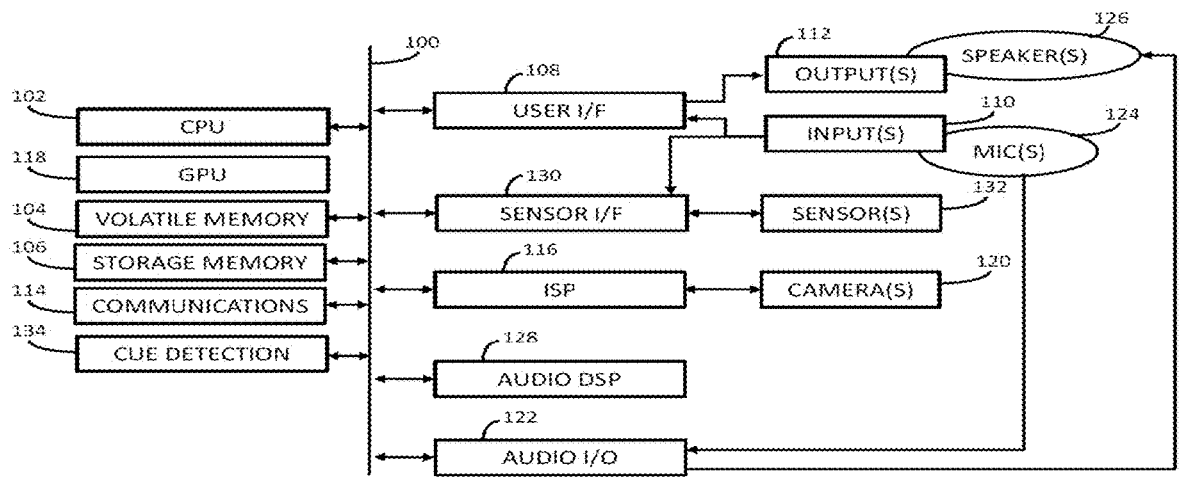
Fig. 19

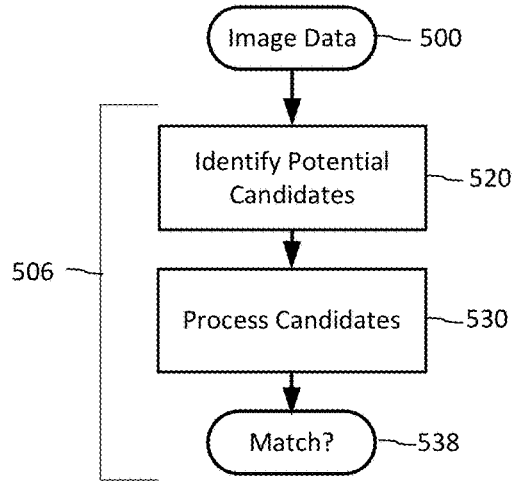
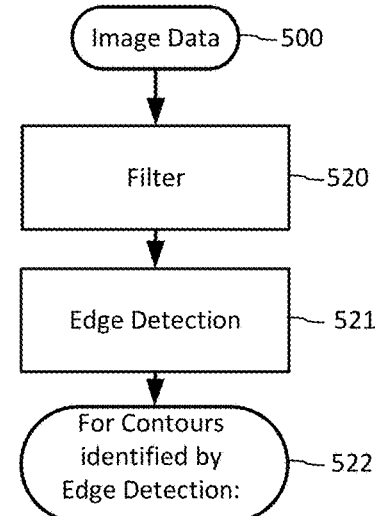
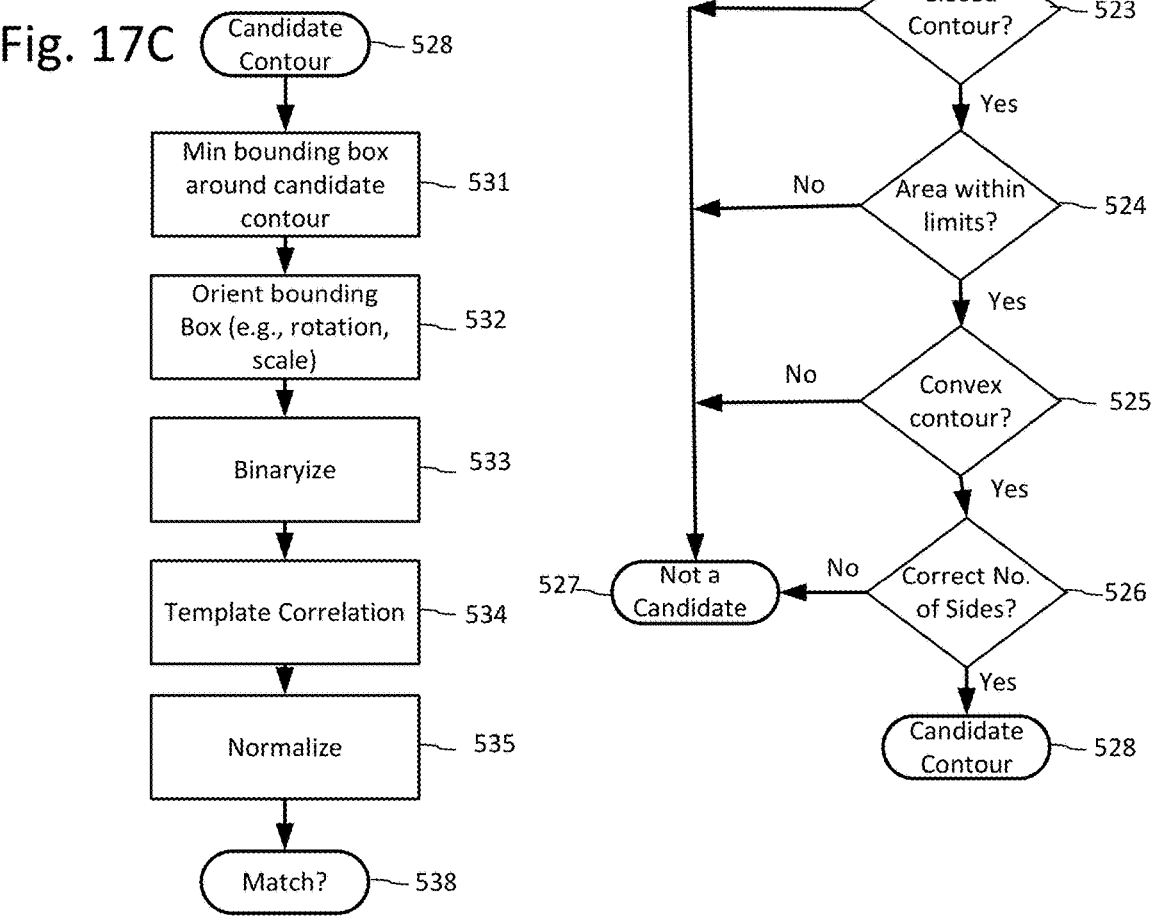

```
function bb = minBoundingBox(X)
% compute the minimum bounding box of a set of 2D points
%   Use:   boundingBox = minBoundingBox(point_matrix)
%
% Input:  2xn matrix containing the [x,y] coordinates of n points
%         *** there must be at least 3 points which are not collinear
% output: 2x4 matrix containing the coordinates of the bounding box corners
%
% Example : generate a random set of point in a randomly rotated rectangle
%     n = 50000;
%     t = pi*rand(1);
%     X = [cos(t) -sin(t) ; sin(t) cos(t)]*[7 0; 0 2]*rand(2,n);
%     X = [X  20*(rand(2,1)-0.5)];  % add an outlier
%
%     tic
%     c = minBoundingBox(X);
%     toc
%
%     figure(42);
%     hold off,  plot(X(1,:),X(2,:),'.')
%     hold on,   plot(c(1,[1:end 1]),c(2,[1:end 1]),'r')
%     axis equal % compute the convex hull (CH is a 2*k matrix subset of X)
k = convhull(X(1,:),X(2,:));
CH = X(:,k);

% compute the angle to test, which are the angle of the CH edges as:
%   "one side of the bounding box contains an edge of the convex hull"
E = diff(CH,1,2);            % CH edges
T = atan2(E(2,:),E(1,:));    % angle of CH edges (used for rotation)
T = unique(mod(T,pi/2));     % reduced to the unique set of first quadrant angles % create rotation matrix which contains
% the 2x2 rotation matrices for *all* angles in T
% R is a 2n*2 matrix
R = cos( reshape(repmat(T,2,2),2*length(T),2) ... % duplicate angles in T
    + repmat([0 -pi ; pi 0]/2,length(T),1));   % shift angle to convert sine in cosine % rotate CH by all angles
RCH = R*CH;
```

Fig. 18A

DETECTION OF ENCODED SIGNALS AND ICONS

RELATED DATA

This application claims the benefit of U.S. Patent Application No. 62/488,661, filed Apr. 21, 2017. This application is also a continuation in part of U.S. patent application Ser. No. 15/448,403, which claims the benefit of US Patent Application Nos. 62/429,539, filed Dec. 2, 2016, 62/405, 709, filed Oct. 7, 2016, and 62/400,083, filed Sep. 26, 2016. This application is also related to U.S. patent application Ser. No. 15/441,006 (U.S. Pat. No. 10,262,176), filed Feb. 23, 2017; U.S. Pat. Nos. 9,117,268, 9,224,184, 9,380,186, 9,401,001, US Published Patent Application Nos. 20160217547 and 20160275639, and U.S. patent application Ser. No. 15/426,630, filed Feb. 7, 2017 (issued as U.S. Pat. No. 9,805,435). Each of the above patent documents is hereby incorporated herein by reference in its entirety.

TECHNICAL FIELD

This disclosure relates to automatic identification of objects and icons, and related image signal processing.

BACKGROUND AND SUMMARY

Barcodes have dramatically transformed the efficiency of retail store operation. Nevertheless, correct identification and handling of products is challenging when there are potentially conflicting labels applied to items or groups of items. Such conflict often arises in the following scenarios:

1. groups of separately marked items sold as a unit (e.g., a family pack);
2. items marked with price change labels (e.g., a discount or fixed price label).

In the first case, error occurs when items are recognized and priced individually rather than as a group. In some configurations, a pack is constructed with an over-wrap that obscures barcodes on individual items. The overwrap carries a separate barcode for the family pack. Conflict occurs when a scanner reads barcodes for individual items and the family pack or misses the barcode of the family pack. Conflict also occurs when the scanner reads the barcode of the family pack and then individual items, without treating the individual items as part of the pack. In another family pack configuration, the individual items are held in a carrying case that bears the barcode of the family pack. The individual items may be oriented to obscure their barcodes, yet they may still be visible. The items within a pack may be different items that the retailer wishes to sell together or multiple instances of the same item in a group. In the former situation, each of the items contains a different barcode, which is also different than the group barcode. In all these cases, errors occur when the scanner provides decoded product codes for the individual items in the family pack.

In the case of price change labels, error occurs when the scanner or checker misses the price change item, and instead, only provides the product code for the product without the price change. Additional slowing occurs in the check-out process when the checker is required to manually enter the change in price.

Other errors may occur due to conflicting codes inserted in product packaging artwork or printing errors. In the former case, a package design file may encompass design elements, each bearing a different product code, which may conflict in some cases. Also, the package design file may include references to artwork in other files, which is composited to produce the package design image prior to printing. In this image assembly process, conflicting codes may be incorporated from the artwork in the reference files. In the latter case, conflicting codes may be printed due to printing plates that apply imagery with conflicting codes. Also, printing may occur with plural print stages, in which a first print technology like flexography or offset applies a first design to a package substrate, and a second print technology like a digital offset or inkjet applies a second design to a package substrate.

The problem with these scenarios is that they cause pricing error and slow down the check-out process. Below, we describe approaches for scanner devices to identify items accurately and at higher speed while minimizing use of processing resources within the POS system or requiring manual intervention by the checker.

One aspect of the disclosure is a scanner with control logic that resolves code conflicts based on detection results from one or more recognition units in the scanner. The scanner includes a processor that controls illumination and image capture by an imager of an object within its view volume. A processor executes a controller process to receive a detection result from a recognition unit for image frames captured of an object or objects in the view volume. For some objects, the detection results acquired from sensing the object within a scan operation (typically under 1 second) includes an outer or inner code, or both. An example of an outer code is an identifier of a family pack or price change label, while an example of an inner code is an identifier of a family pack member or product identifier of a product with a price change label attached.

The controller analyzes the detection result by comparing the detection result with state stored for a prior detection result during the scan operation to determine whether to initiate one of plural types of waiting periods based on the type of detection result and comparing the detection result with a prior result in a state data structure. The controller sets the waiting period to control reporting of an outer code relative to an inner code on the package. It enforces a first type of waiting period and control logic to control reporting of an inner code after detection of an outer code and a second type of waiting period and control logic to delay reporting of an inner code until the second type of waiting period ends. Variations of the waiting period and control logic are described further below.

Another aspect of the disclosure is a smartphone comprising: an imager for capturing plural image frames of a package; a processor coupled to the imager; the processor configured to execute a controller process, the controller process comprising instructions executed by the processor to: analyze image data associated with an image frame, the image frame captured by said imager, in which the analyze image data executes to detect the presence or absence of an icon and to decode a signal encoded within the image data; and provide a first response when the signal is decoded but the icon is not detected; provide a second, different response when the signal is decoded and the icon is detected.

Yet another aspect is a method of detecting the presence of an icon in imagery, the imagery captured by a camera integrated within a portable electronic device. The method comprises: using one or more cores of a multi-core processor, filtering the imagery to remove noise, said filtering yielding filtered imagery; detecting a plurality of contours within the filtered imagery, and for each of the plurality of contours, executing the following criteria checks: i) determining whether the contour is closed; ii) determining whether the contour comprises an area associated within a predetermined area range; and iii) determining whether the contour comprises a convex contour; outputting an indication that the contour comprises a candidate contour only when each of criteria i, ii and iii are satisfied.

Additional aspects of the disclosure include control logic and associated methods for integrated within automatic identification devices, and various configurations and types of recognition units and controller logic for determining when and how to handle responses when an icon is detection in the presence or absence of encoded signals.

Further aspects, advantages and features are described and illustrated in the detailed description and drawings below.

BRIEF DESCRIPTION OF THE DRAWINGS

FIG. 15 is a rendition of a physical object including an icon and various encoded symbologies.

FIG. 17A is a flow diagram showing two stages associated with the icon detector of FIG. 16A.

FIG. 17B is a flow diagram showing stage 1 of the icon detector shown in FIG. 17A.

FIG. 17C is a flow diagram showing stage 2 of the icon detector shown in FIG. 17A.

FIGS. 18A and 18B show an example MatLab script.

FIG. 19 is a block diagram of an electronic device (e.g., a smartphone) that can be used to carry out the processes and features shown in FIGS. 16-17C and 20A-20E.

FIG. 20D is another flow diagram for icon matching of candidate contours.

DETAILED DESCRIPTION

Figure 1:
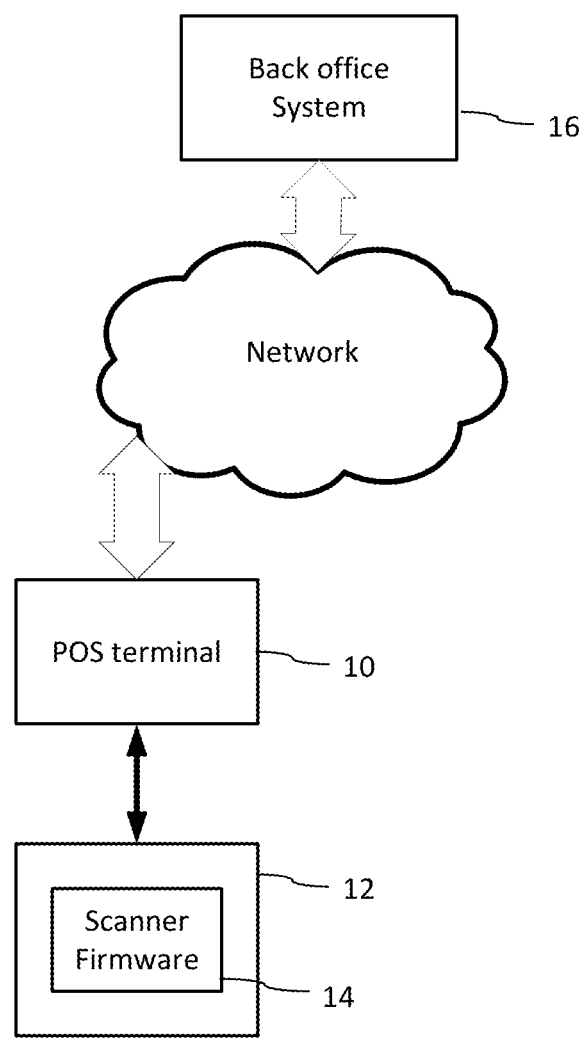
FIG. 1 is a system diagram illustrating components of a point of sale system in a retail store.

FIG. 1 is a system diagram illustrating components of a point of sale system in a retail store. Each check-out station is equipped with a POS terminal 14 and scanner 12. The scanner has a processor and memory and executes scanner firmware, as detailed further below. The POS terminal is a general purpose computer connected to the scanner via a standard cable or wireless interconnect, e.g., to connect the scanner directly to a serial port, keyboard port, USB port or like port of the POS terminal or through an interface device (e.g., a wedge). Each of the POS terminals are connected via a network to the store's back office system 16.

Items in the store are assigned an identification number in a numbering scheme managed by GS1 called a Global Trade Identification Number (GTIN). The GTIN plays a vital role within store operations as it identifies products and acts as a database key to associate the product with product attributes including its name and price. For many products, the GTIN is assigned by the manufacturer of the item and encoded in the packaging, via a UPC Symbol and, preferably, a digital encoding that replicates the GTIN in two-dimensional tiles across the package design, as detailed further below. One example of such tiled data encoding is a Digimarc Barcode data carrier from Digimarc Corporation of Beaverton, Oreg. The retailer's system has a database of item files for each of the products it sells. This item file includes various attributes of the item that the store uses to manage its operation, such as price, scanning description, department ID, food stamp information, tax information, etc. The POS terminal retrieves this information as needed from the back office by querying the database with the item identifier (e.g., a GTIN of the product provided by the scanner).

A barcode, preferably the Digimarc Barcode data carrier, is used to convey family pack identifiers and price change codes on packaging. For family packs, the retailer or manufacturer assigns a GTIN as the product identifier of the pack, and creates an associated item file for that pack. The GTIN is encoded in a conventional barcode and/or the Digimarc Barcode data carrier applied to the over-wrap or carrier of the pack. The Digimarc Barcode data carrier is advantageous because it replicates the GTIN across the package to provide more efficient and reliable decoding of a GTIN, and has additional data capacity to carry one or more flags indicating to the scanner that family pack or price change processing logic applies.

Barcodes, and in particular, Digimarc Barcode data carriers, are preferably used to convey price change information in labels applied to product packaging. Price changes are usually of one of the following two types: a discount code, or a new fixed price. In the former, the discount code references a monetary amount to be reduced from the price assigned to the item's GTIN. In the latter, the code references a new fixed price that replaces the price assigned to the item's GTIN. The Digimarc Barcode data carrier also includes a flag indicating that price change processing logic applies in the scanner. As an additional or alternative means to trigger processing logic, the price change label may have other detectable properties, such as a color or spectral composition, shape, RFID tag, image template, or marking that the scanner's recognition unit(s) can detect.

Price changes are typically managed by department within a retailer. This enables the managers of the departments, such as the bakery, meat, product and deli departments, to determine when and how much to discount items that they wish to move from their inventory. The price change information includes a department identifier, enabling the retailer's system to track the price change to the department. The new fixed price or price change may be encoded directly in the digital payload of the data carrier printed on the price change label. Alternatively, the fixed price or discount may be stored in an item record and looked up by the POS using the code decoded from the payload. In some systems, a GTIN identifying a product or class of products to which the price change applies may be included in the payload of the data carrier on the product as well.

For some products, the product information, such as the GTIN, is printed by a label printer within the store. One example is a label printer within a scale, which is used to weigh and print a label for a variable weight item. The GTIN format includes fields used to encode the variable nature of such items by encoding a variable amount (e.g., variable weight) or a variable price. Preferably this GTIN is encoded on the label with a Digimarc Barcode data carrier, though conventional barcodes may also be used.

Variable items are a prime example of items that often are subject to price changes. To facilitate price changes, a label with the price change is applied to the item as described above. This label may be applied over the prior label to obscure it, or may be applied next to it. The label printer in the store may be configured to print a price change label, which fits over the original label, or complements it. In either case, the scanner decodes the code or codes it detects on the package, and its processing logic issues the correct product and pricing information to the POS system.

The back office system maintains a database of item file information in its memory (persistent and volatile memory (e.g., RAM), as needed). It uses the GTIN to associate a product with the product attributes and retrieves these attributes and delivers them to the scanning application software of the POS terminal in response to database queries keyed by the GTIN or like item code. Item files are also created for family pack items and price change labels. In some configurations, the item database is mirrored within the POS terminals of the retail store, and each POS terminal executes item look up operations within its local copy of the item database.

During the scanning operation, the POS scanning application software obtains the output of the scanner, which is comprised of the recognized codes, e.g., GTIN, price change code, or like code. It then does a look up, either locally or via the back office to get related attributes for each code. With these attributes, the POS software executes typical POS functions, such as displaying product name and price during check-out, tabulating total price, with taxes and discounts, coupons, etc.; managing payment, and generating a receipt. Importantly, the POS software need not be modified to handle family pack configurations and price changes. Instead, the scanner logic resolves potential code scanning conflicts and reports the resolved code or codes in a fashion that the POS terminal is accustomed to seeing.

A scanning application executes within each of the store's POS terminals. This application is responsible for obtaining the codes reported by the scanner hardware and performing the attribute look up operation. It receives each code from the scanner, in response to the scanner decoding UPC and Digimarc Barcode data carrier during check-out. A processor in the scanner executes firmware instructions loaded from memory to perform these decoding operations.

Figure 2:
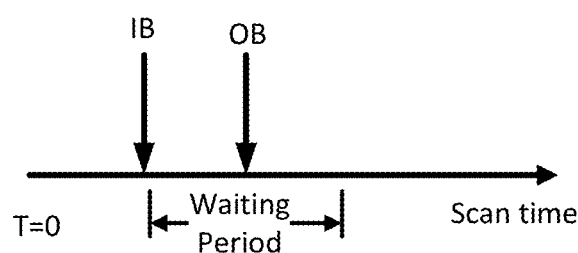
FIG. 2 is a diagram illustrating a sequence of decode operations by a scanner.
Figure 3:
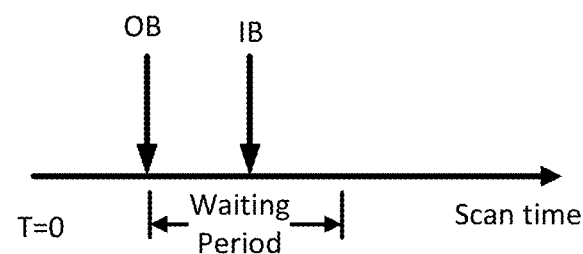
FIG. 3 is a diagram illustrating another sequence of decode operations by the scanner.

Processing logic within the scanning operation handles the above-described cases of family pack and price changes. FIGS. 2 and 3 are diagrams illustrating sequencing of decode operations to set the stage for the processing logic that interprets the sequence. During check out at the POS terminal, the scanner executes recognition operations on image frames captured while a product package or packages move through its field of view. From mere decoding of conventional barcodes, it is not determinable whether the barcodes originate from the same or different objects. To address this, we have incorporated new features in encoding on the package and logic within the scanner.

For purposes of illustration, we introduce the concept of an "inner barcode," (TB) and "outer barcode" (OB). The inner barcode corresponds to a barcode of an individual item in a family pack or the original barcode on a package, before a price change label is added. The "outer barcode" corresponds to a barcode of the family pack or a price change label. Though the family pack code may indeed be outside the member item code (e.g., in the case of an over-wrap), it need not be. The same is true for the price change label relative to the original barcode on a product.

Inner and outer barcodes are examples of a broader category of inner and outer codes detected by the scanner. These codes may be detected by image recognition methods, of which optical code reading is a subset. Other forms of image recognition are feature extraction and matching and template matching (e.g., a price change label template), to name two examples. They may also be detected by other sensor types, such as RFID, and a combination of sensor input, e.g., weight from a scale (e.g., to distinguish a family pack from a family pack member), geometric features from image feature extraction (including depth from a depth sensor), and spectral information (color such as a color histogram of a detected object, or pixel samples from spectral bands obtained by multi-spectral illumination and/or multi-spectral filters).

FIG. 2 illustrates a sequence in which decoding of an inner barcode precedes an outer barcode. Whenever the scanner decodes an inner barcode, it does not immediately report it. Instead, it pauses for a predetermined delay, e.g., in the range of around 500 ms. The amount of this delay may be specified in relative or absolute time by a flag in the data carrier (namely, in the digital data encoded in the family pack or family pack member). If the next barcode is an outer barcode of a family pack, the scanner logic reports only the GTIN for the family pack.

If the outer barcode is a price change, the scanner logic reports it. The scanner logic that controls which code or codes to report depend on whether the price change is a fixed price or a discount code. For a fixed price code, that fixed price code replaces the code from the inner barcode as it provides the code that the POS terminal uses to query the back office database for the new price. For a discount code, the logic causes the scanner to report the discount code as well as the code from first detected barcode that triggered the waiting period.

In these scenarios, data flags are encoded in the inner and/or outer barcode data carriers to signal to the scanner that an outer barcode may accompany the inner barcode. For family packs, for example, the inner barcode of FIG. 2 signals that it is part of a family pack, which in turn, triggers a waiting period for the scanner to detect an outer barcode. If no outer barcode is decoded in the waiting period, then scanner reports the inner barcode to the POS terminal.

FIG. 3 illustrates a sequence in which decoding of an outer barcode precedes an inner barcode. This sequence may occur, for example, following the decoding of the outer barcode of FIG. 2. In this case, the scanner logic similarly waits for a predetermined period of time (e.g., 500 ms). A barcode decoded in the waiting period is ignored if a family pack flag is set because a barcode detected in this waiting period is deemed to be from the same family pack. The time range for the waiting period may vary with the device, as each device has different image capture systems, with different field of view parameters, which govern the number and type of views captured of an object or group of objects as they are scanned in the scanner view volume. Checker usage patterns also govern the waiting period, as they also impact movement of objects through the view volume, and/or how the checker employs the scanner to image objects. The waiting period can range from around 300 ms to 1.5 seconds.

For a price change label, the logic depends on the type of price change. For a fixed price code detected as the OB of FIG. 3, an inner barcode detected in the waiting period is ignored. For a discount code, the inner barcode in the waiting period is reported.

Having illustrated high level operation of the scanner logic, we now provide additional implementation details. The details of the implementation vary with the hardware and software configuration of the scanner, as well as the type of codes and recognition processes employed within the scanner.

Image based scanners typically fall into two classes: fixed and hand-held. Fixed scanners are designed to be integrated within a check-out station, at which the operator or a conveyor moves items in the field of the scanner's image capture system. The image capture system is comprised of optical elements, such as a lens, mirror(s), beam splitter(s), 2D imager (e.g., CMOS camera), which together enable capture of plural views of an object that are combined into a single frame. Additionally, an illumination source is also included to illuminate the object for each capture. See, e.g., US Publication Nos. 20090206161 and 20130206839, which are incorporated by reference.

Hand-held scanners are, as the name implies, designed to be held in the hand and pointed at objects. They have different optical systems adapted for this type of capture, including lens, sensor array adapted for capturing at varying distances, as well as illumination source for illuminating the object at these distances.

These image based systems capture frames in range of around 10 to 90 frames per second. In some imager based scanners, processing of a frame must be complete prior to the arrival of the next frame. In this case, the scanner processing unit or units have from 10 to 100 ms to decode at least one code and perform other recognition operations, if included.

In other imager based scanners, image processing of image frames is governed by time constraints, not strictly frames. In this form of real time image processing, the processing unit or units within the device process frames concurrently but when processing capacity reached, some frames get dropped, and processing resumes on subsequent frames when processing capacity is available. This type of resource management is sometimes employed opportunistically in response to detecting an object in the view volume of the scanner's imaging system. For example, as a new object enters the view volume, an image process executing within the scanner detects it and launches decoding processes on subsequent frames.

Figure 4:
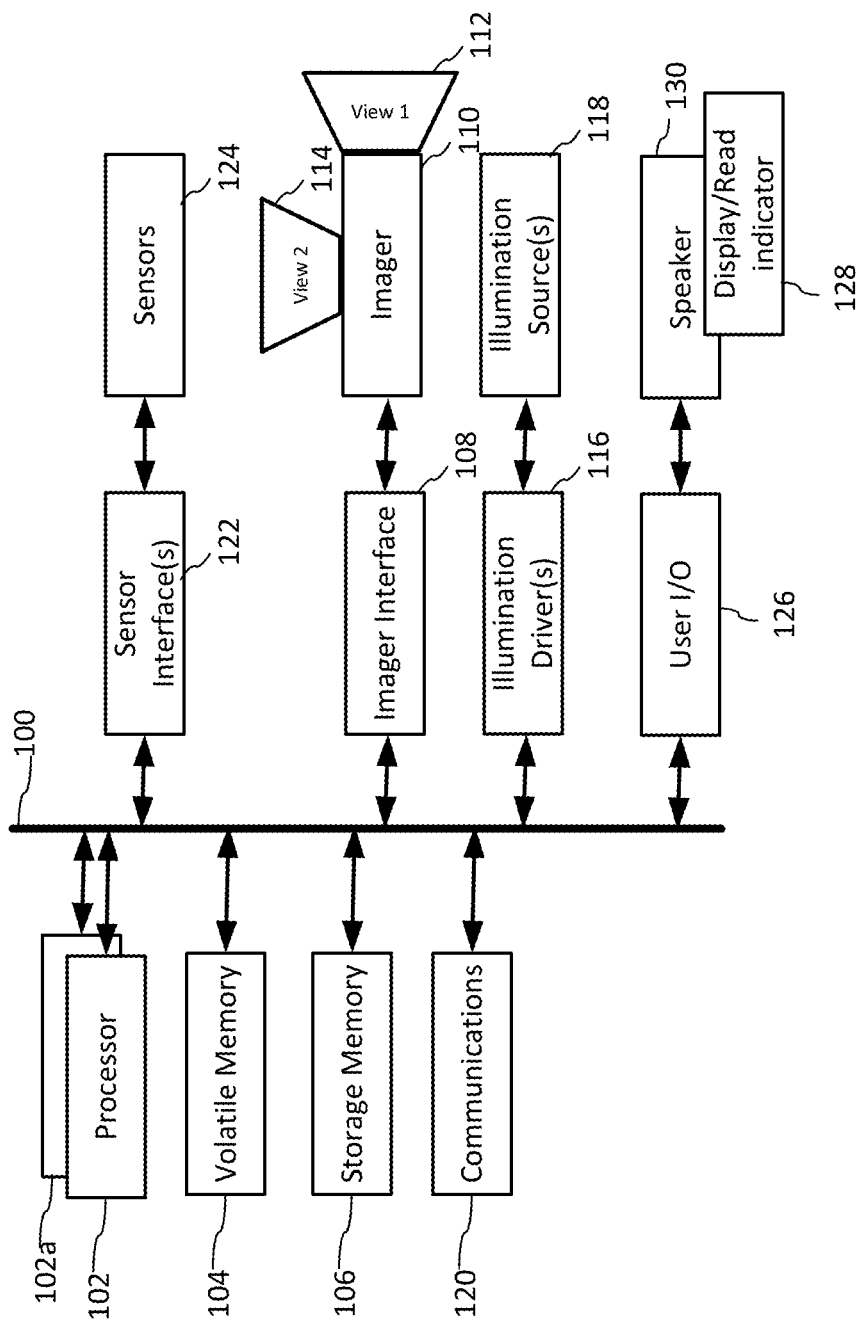
FIG. 4 is a diagram of components in an imager based scanner.

For the sake of illustration, FIG. 4 is a diagram of components in an imager based scanner. Our description is primarily focused on fixed, multi-plane imager based scanner. However, it is not intended to be limiting, as the embodiments may be implemented in other imaging devices, such as hand-held scanners, smartphones, tablets, machine vision systems, etc.

Please also see the specification of assignee's co-pending application Ser. No. 14/842,575, published as US 2017-0004597 A1, which is hereby incorporated herein by reference. This specification describes hardware configurations for reading machine readable data encoded on objects, including configurations usable with imager based scanners used in automatic identification applications.

Referring to FIG. 4, the scanner has a bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 facilitates both DMA transfers and direct processor read and write instructions. In one embodiment, the bus 100 is one of the Advanced Microcontroller Bus Architecture (AMBA) compliant data buses. Although FIG. 4 illustrates an embodiment in which all components are communicatively coupled to the bus 100, one or more components may be communicatively coupled to a separate bus, and may be communicatively coupled to two or more buses. Although not illustrated, the scanner can optionally include one or more bus controllers (e.g., a DMA controller, an I2C bus controller, or the like or combination thereof), through which data can be routed between certain of the components.

The scanner also includes at least one processor 102. The processor 102 may be a microprocessor, mobile application processor, etc., known in the art (e.g., a Reduced Instruction Set Computer (RISC) from ARM Limited, the Krait CPU product-family, X86-based microprocessor available from the Intel Corporation including those in the Pentium, Xeon, Itanium, Celeron, Atom, Core i-series product families, etc.). The processor may also be a Digital Signal Processor (DSP) such the C6000 DSP category from Texas Instruments. FIG. 4 shows a second processor behind processor 102 to illustrate that the scanner may have plural processors, as well as plural core processors. Other components on the bus 100 may also include processors, such as DSP or microcontroller.

Processor architectures used in current scanner technology include, for example, ARM (which includes several architecture versions), Intel, and TI C6000 DSP. Processor speeds typically range from 400 MHz to 2+ Ghz. Some scanner devices employ ARM NEON technology, which provides a Single Instruction, Multiple Data (SIMD) extension for a class of ARM processors.

The processor 102 runs an operating system of the scanner, and runs application programs and, manages the various functions of the device. The processor 102 may include or be coupled to a read-only memory (ROM) (not shown), which stores an operating system (e.g., a "high-level" operating system, a "real-time" operating system, a mobile operating system, or the like or combination thereof) and other device firmware that runs on the scanner.

The scanner also includes a volatile memory 104 electrically coupled to bus 100 (also referred to as dynamic memory). The volatile memory 104 may include, for example, a type of random access memory (RAM). Although not shown, the scanner includes a memory controller that controls the flow of data to and from the volatile memory 104. Current scanner devices typically have around 500 MB of dynamic memory, and provide a minimum of 8 KiB of stack memory for certain recognition units. For some embodiments of the watermark processor, which is implemented as an embedded system SDK, for example, it is recommended that the scanner have a minimum of 8 KiB stack memory for running the embedded system SDK.

The scanner also includes a storage memory 106 connected to the bus. The storage memory 106 typically includes one or more non-volatile semiconductor memory devices such as ROM, EPROM and EEPROM, NOR or NAND flash memory, or the like or combinations thereof, and may also include alternative storage devices, such as, for example, magnetic or optical disks. The storage memory 106 is used to store one or more items of software. Software can include system software, application software, middleware, one or more computer files (e.g., one or more data files, configuration files, library files, archive files, etc.), one or more software components, or the like or stack or other combination thereof.

Examples of system software include operating systems (e.g., including one or more high-level operating systems, real-time operating systems, mobile operating systems, or the like or combination thereof), one or more kernels, one or more device drivers, firmware, one or more utility programs (e.g., that help to analyze, configure, optimize, maintain, etc., one or more components of the scanner), and the like. Suitable operating systems for scanners include but are not limited to Windows (multiple versions), Linux, iOS, Quadros, and Android.

Compilers used to convert higher level software instructions into executable code for these devices include: Microsoft C/C++, GNU, ARM, and Clang/LLVM. Examples of compilers used for ARM architectures are RVDS 4.1+, DS-5, CodeSourcery, and Greenhills Software.

Also connected to the bus 100 is an imager interface 108. The imager interface 108 connects one or more one or more imagers 110 to bus 100. The imager interface supplies control signals to the imagers to capture frames and communicate them to other components on the bus. In some implementations, the imager interface also includes an image processing DSP that provides image processing functions, such as sampling and preparation of groups of pixel regions from the 2D sensor array (blocks, scanlines, etc.) for further image processing. The DSP in the imager interface may also execute other image pre-processing, recognition or optical code reading instructions on these pixels. The imager interface 108 also includes memory buffers for transferring image and image processing results to other components on the bus 100.

Though one imager 110 is shown in FIG. 4, the scanner may have additional imagers. Each imager is comprised of a digital image sensor (e.g., CMOS or CCD) or like camera having a two-dimensional array of pixels. The sensor may be a monochrome or color sensor (e.g., one that employs a Bayer arrangement), and operate in a rolling and/or global shutter mode. Examples of these imagers include model EV76C560 CMOS sensor offered by e2v Technologies PLC, Essex, England, and model MT9V022 sensor offered by On Semiconductor of Phoenix, Ariz. Each imager 110 captures an image of its view or views of a view volume of the scanner, as illuminated by an illumination source. The imager captures at least one view. Plural views (e.g., view1 112 and view2 114) are captured by a single imager in scanners where optical elements, such as mirrors and beam splitters are used to direct light reflected from different sides of an object in the view volume to the imager.

Also coupled to the bus 100 is an illumination driver 116 that controls and illumination sources 118. Typical scanners employ Light Emitting Diodes (LEDs) as illumination sources. In one typical configuration, red LEDs are paired with a monochrome camera. The illumination driver applies signals to the LEDs to turn them on in a controlled sequence (strobe them) in synchronization with capture by an imager or imagers. In another configuration, plural different color LEDs may also be used and strobed in a manner such that the imager(s) selectively capture images under illumination from different color LED or sets of LEDs. See, e.g., Patent Application Publication Nos. 20130329006, entitled COORDINATED ILLUMINATION AND IMAGE SIGNAL CAPTURE FOR ENHANCED SIGNAL DETECTION, and 20160187199 entitled SENSOR-SYNCHRONIZED SPECTRALLY-STRUCTURED-LIGHT IMAGING, which are hereby incorporated by reference. The latter captures images in plural different spectral bands beyond standard RGB color planes, enabling extraction of encoded information as well as object recognition based on pixel samples in more narrow spectral bands at, above and below the visible spectrum.

In another configuration, a broadband illumination source is flashed and image pixels in different bands, e.g., RGB, are captured with a color image sensor (e.g., such as one with a Bayer arrangement). The illumination driver may also strobe different sets of LED that are arranged to illuminate particular views within the view volume (e.g., so as to capture images of different sides of an object in the view volume).

A further extension of scanner capability is to include a RGB+D imager, which provides a depth measurement in addition to Red, Green and Blue samples per pixel. The depth sample enables use of object geometry to assist in product identification.

The scanner also includes at least one communications module 118, each comprised of circuitry to transmit and receive data through a wired or wireless link to another device or network. One example of a communication module is a connector that operates in conjunction with software or firmware on the scanner to function as a serial port (e.g., RS232), a Universal Serial Bus (USB) port, and an IR interface. Another example of a communication module in a scanner is a universal interface driver application specific integrated circuit (UIDA) that supports plural different host interface protocols, such as RS-232C, IBM46XX, or Keyboard Wedge interface. The scanner may also have communication modules to support other communication modes, such as USB, Ethernet, Bluetooth, WiFi, infrared (e.g., IrDa) or RFID communication.

Also connected to the bus 100 is a sensor interface module 122 communicatively coupled to one or more sensors 124.

Some scanner configurations have a scale for weighing items, and other data capture sensors such as RFID or NFC readers or the like for reading codes from products, consumer devices, payment cards, etc.

The sensor interface module 130 may also optionally include cache or other local memory device (e.g., volatile memory, non-volatile memory or a combination thereof), DMA channels, one or more input buffers, one or more output buffers to store and communicate control and data signals to and from the sensor.

Finally, the scanner may be equipped with a variety of user input/output devices, connected to the bus 100 via a corresponding user I/O interface 126. Scanners, for example, provide user output in the form of a read indicator light or sound, and thus have an indicator light or display 128 and/or speaker 130. The scanner may also have a display and display controller connecting the display device to the bus 100. For I/O capability, the scanner has a touch screen for both display and user input.

Figure 5:
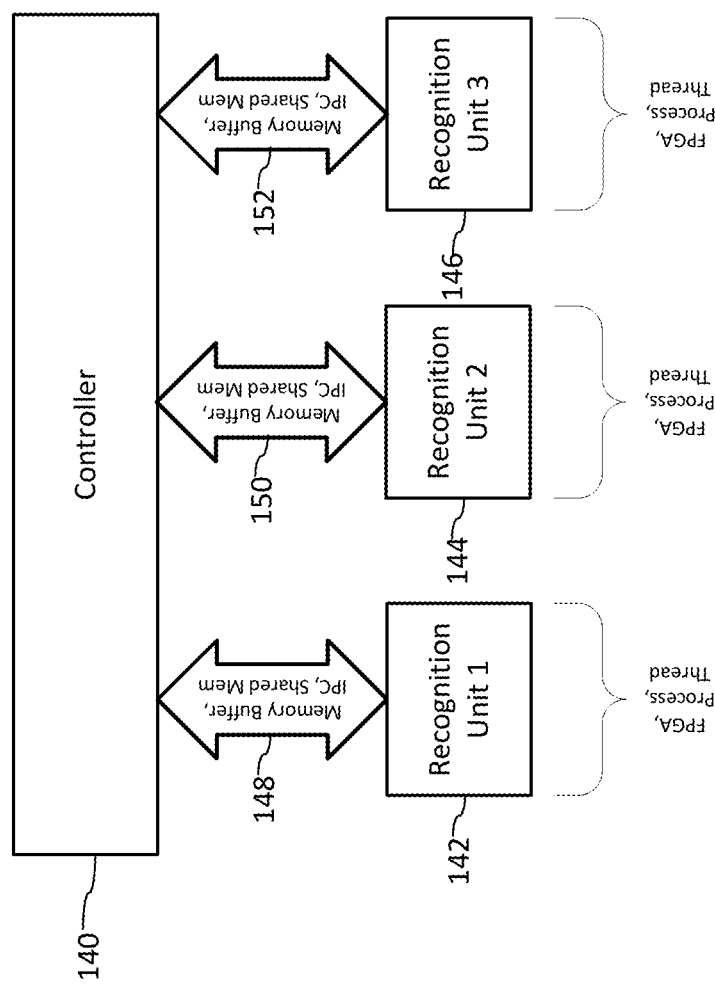
FIG. 5 is a diagram illustrating a processing architecture for controlling recognition units within a scanner.

FIG. 5 is a diagram illustrating a processing architecture for controlling recognition units within a scanner. The processing architecture comprises a controller and recognition units. Each of these elements is a logical processing module implemented as a set of instructions executing on a processor in the scanner, or implemented in an array of digital logic gates, such as a Field Programmable Gate Array (FPGA) or Application Specific Integrated Circuit (ASIC). Each of the modules may operate within a single component (such as a processor, FPGA or ASIC), within cores of a plural core processor, or within two or more components that are interconnected via the bus 100 or other interconnect between components in the scanner hardware of FIG. 4. The implementer may create the instructions of each module in a higher level programming language, such as C/C++ and then port them to the particular hardware components in the scanner architecture of choice.

In this example, we show a controller and three recognition units. There may be more or less of each in a given implementation. The controller 140 is responsible for sending recognition tasks to recognition units (142, 144 and 146), getting the results of those tasks, and then executing logic to determine the item code to be sent to the host POS system of the scanner. The controller module 140 communicates with the recognition units (142-146) via communication links 148, 150, 152. The manner in which the controller communicates with the recognition units depend on the implementation of each. To communicate with an FPGA, the controller communicates through a memory buffer, e.g., via the bus 100.

To communicate among software processes, the controller process employs inter-process communication (IPC). The particular form of IPC depends in part on the operating system executing in the scanner. For a Unix OS or Unix derivatives, IPC may be implemented with sockets. Windows based Operating Systems from Microsoft Corp. also provide an implementation of sockets for IPC.

Finally, controller and recognition units may be implemented within a single software process in which communication among software routines within the process is implemented with shared memory. Within a process, the software program of each recognition units may be executed serially and report its results back to the controller. Recognition units may also be executed as separate threads of execution. The operating system running in the scanner manages pre-emptive multi-tasking and multi-threading (if employed) for software processes and threads. The operating system also manages concurrent execution on processes on processors, in some scanners where more than one processor is available for the controller, recognition units, and other image processing.

A recognition unit executes instructions on an image block provided to it to recognize an object or objects in the image block and return a corresponding recognition result. For optical codes like barcodes and Digimarc Barcode data carriers, the recognition result comprises the digital payload extracted from the carrier, which may be formatted as a string of binary or M-ary symbols or converted to a higher level code such as a GTIN data structure in accordance with the GS1 specification for GTINs. Recognition units that perform optical code reading include, for example, optical code readers for 1-dimensional optical codes like UPC, EAN, Code 39, Code 128 (including GS1-128), stacked codes like DataBar stacked and PDF417, or 2-dimensional optical codes like a DataMatrix, QR code or MaxiCode.

Some scanners also have varying levels of object recognition capability, in which the recognition process entails feature extraction and classification or identification based on the extracted features. Some of these type of recognition processes provide attributes of an item or label, or a class of the product or label. Attributes of the item include color (e.g., color histogram) or geometry, such as position, shape, bounding region or other geometric attributes). The attributes may be further submitted to a classifier to classify an item type. The controller combines this information with other recognition results or sensor input to disambiguate plural codes detected from an object in the view volume.

Depending on processing power, memory and memory bandwidth constraints, the scanner may have more sophisticated object recognition capability that is able to match extracted features with a feature database in memory and identify a product based on satisfying match criteria. This technology is described further below.

Though we are primarily focused on image processing recognition, the recognition units may also operate on other sensed data. Examples include decoding of an RFID tag based on sensed RF signal input, and weight attributes from a scale.

Figure 6:
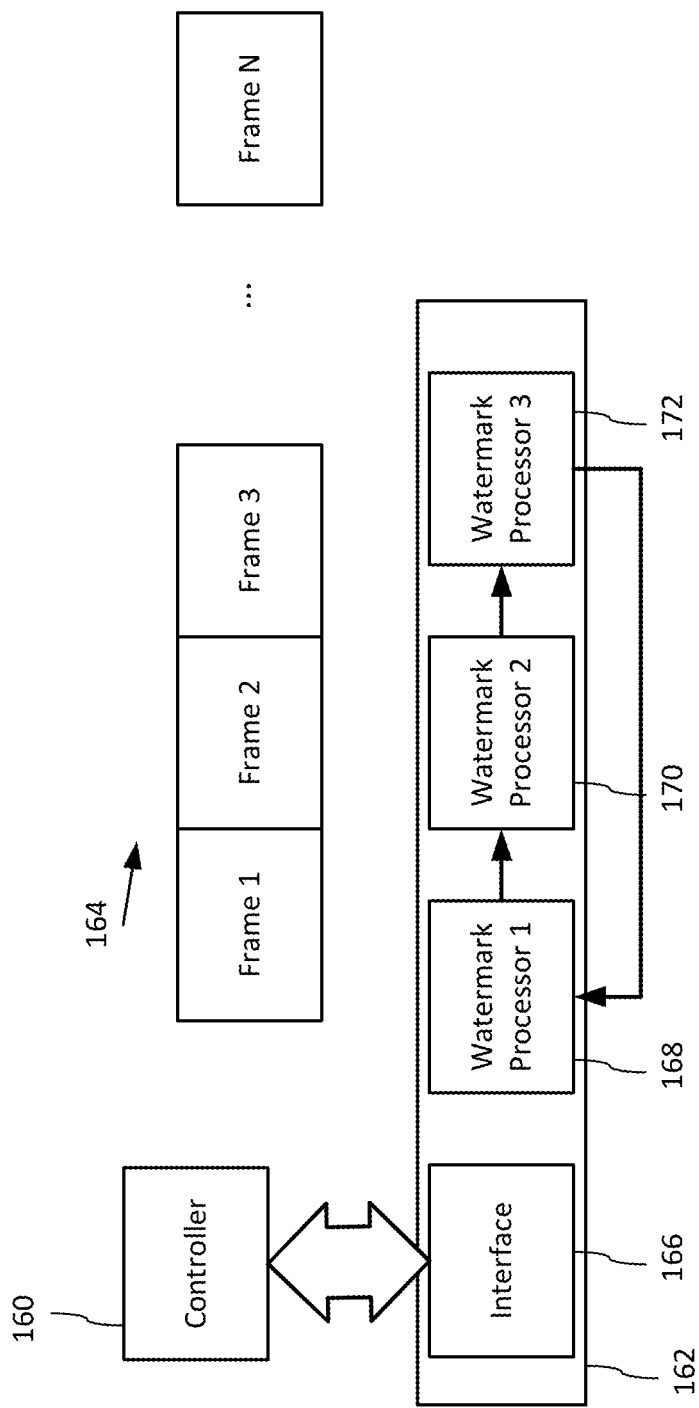
FIG. 6 is diagram illustrating software modules that operate on a sequence of image frames to detect and extract digital payloads from images of objects within the frames.

FIG. 6 is diagram illustrating a software modules 160, 162 that operate on a sequence of image frames 164 to detect and extract digital payloads from images of objects within the frames. Controller 160 is an example of a controller 140 in the architecture of FIG. 5. This diagram illustrates the interaction of a controller with one particular implementation of a recognition unit 162. In this instance, the controller 160 and recognition unit are software processes. In one embodiment, they execute on distinct processors within the scanner. For example, they execute either in the separate processors 102, 102a, or the controller executes in processor 102 and recognition unit executes in a processor within the imager interface 108 (e.g., DSP). In another embodiment, they execute within the same processor, e.g., processor 102, or within a DSP in the imager interface 108.

In still another embodiment, the controller executes in processor 102, and the instructions of the recognition unit are implemented within an FPGA or ASIC, which is part of another component, such as the imager interface, or a separate component on bus 100.

The software process of the recognition unit 162 performs a form of recognition that employs digital watermark decoding to detect and extract watermark payloads from encoded data tiles in the image frames 164. The term, "frame," refers to a group of pixels read from a 2D sensor array for a time period in which a 2D image is captured on the sensor array. Recall that the sensor may operate in rolling shutter or global shutter mode. In some implementations, selected rows of the sensor array are sampled during a capture period and stored in a memory buffer (e.g., in the imager interface), which is accessed by the recognition unit(s). In others, an entire frame of all pixels in the sensor array are sampled and stored in a frame buffer, which is then accessed by the recognition unit(s). The group of pixels sampled from a frame may include plural views of the viewing volume, or a part of the viewing volume.

The recognition unit 162 has the following sub-modules of instructions: interface 166 and watermark processors 168, 170, 172. The interface comprises software code for receiving calls from the controlling and returning recognition results from shared memory of the software process of the recognition unit 162. Watermark processors are instances of watermark decoders.

When an object moves into the view volume of the scanner, controller 160 invokes the recognition unit 162 on image frames containing the object. Via interface 166, the controller 160 calls the recognition unit 162, providing the frames 164 by supplying an address of or pointer to them in the memory of the scanner (image buffer in e.g., either volatile memory 104 or memory buffers in imager interface 108). It also provides other attributes, such as attributes of the view from which the frame originated.

The recognition unit proceeds to invoke a watermark processor 168-172 on frames in serial fashion. Watermark processors 1-3 operate on frames 1-3, and then process flow returns back to watermark processor 1 for frame 4, and so on. This is just one example of process flow in a serial process flow implementation. Alternatively, watermark processors may be executed concurrently within a process as threads, or executed as separate software processes, each with an interface and watermark processor instance.

The recognition unit 162 provides the extracted payload results, if any, for each frame via communication link as described above. The controller analyzes the results from the recognition unit and other recognition units and determines when and what to report to the POS terminal. Each watermark processor records in shared memory of the recognition unit 162 its result for analyzing the image block assigned to it. This result is a no detect, a successful read result along with decoded payload, or payloads (in the event that distinct payloads are detected within a frame). Optionally the watermark processor provides orientation parameters of the decoded payload, which provide geometric orientation and/or position of the tile or tiles from which the payload is decoded.

Figure 7B:
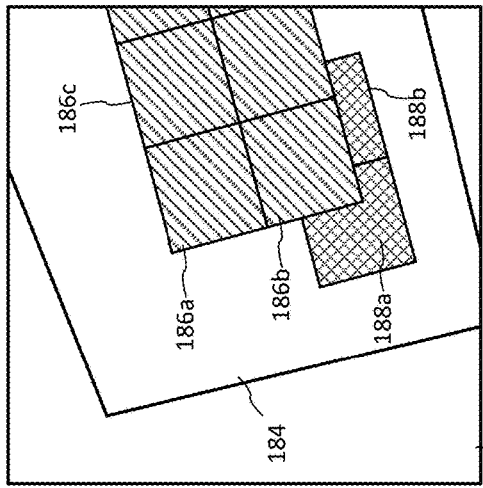
FIGS. 7A and 7B illustrate image portions of an object in different frames captured from a field of view of a scanner's imager.
Figure 7A:
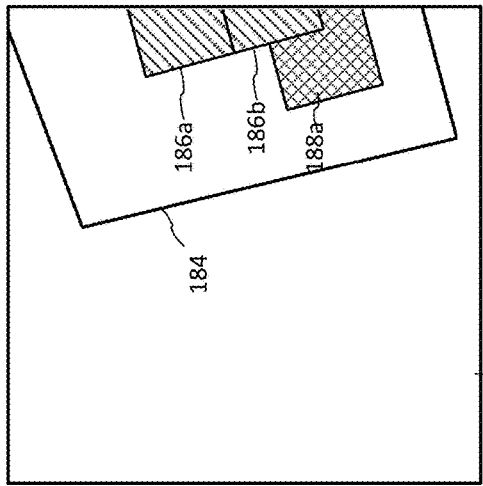

FIGS. 7A and 7B illustrate image portions 180, 182 in different frames captured from a field of view of a scanner's imager. An object 184 is moving through this field of view in these frames. Here, we use the phrase, "image portion," to reflect that the image portion of a frame is not necessarily co-extensive with the entire pixel array of an imager. As noted, an imager may capture plural views of the object 184 per frame, and the image portion may correspond to one particular view of plural different views captured by the image sensor array for a frame. Alternatively, it may encompass plural views imaged within a frame. Also, frames from different imagers may be composited, in which case, the image portion may include a portion of frames composited from different imagers. Nevertheless, FIG. 7A depicts an image block from a frame at a first capture time, and FIG. 7B represents an image block from a second, later capture time.

For sake of illustration, we use an example where the imager has a frame capture rate of 100 frames per second. Thus, a new frame is available for sampling as fast as every 10 ms. The rate at which the controller provides frames or portions of frames to each recognition unit may not be as high as the frame rate. Thus, the frames illustrated here need not be strictly adjacent in a video sequence from the sensor, but are within a time period in which an object 184 moves through the field of view of the scanner. The object movement may be from a checker swiping the object 184 through a field of view of the scanner or positioning a hand held scanner to image the object, or from a mechanical mechanism, such as a conveyor moving an object through a view volume of a scanner. Image portion 180 at frame time, T1, includes an image captured of at least a first part of object 184. This object has encoded data tiles having a first payload 186*a*, 186*b*, and encoded data tile 188*a* having a second payload. Image block 182, at a later frame time, T2, depicts that the object 184 has moved further within the field of view of the scanner. At T2, more tiles are captured, such as 186*c* having the same payload as 186*a* and 186*b*, and 188*b* having the same payload as 188*a*.

FIGS. 7A and 7B illustrate the problem outlined above for conflicting codes on objects. In this scenario, the recognition unit may detect a first code in 188*a* and another code in 186*a* or none of the codes in 186 from frame at T1. However, the reverse may happen for the frame at T2, as more of the tiles of 186 are visible to the scanner than 188. The recognition unit is more likely to detect 186 at T2. The code in 188 is an example of an inner barcode. It is only partially obscured by the label or overwrap on which the code in 186 resides. Tiles 188*a-b* carry an "inner barcode," whereas tiles 186*a-c* contain an "outer barcode," using the terminology introduced earlier.

This sequence illustrates one scenario where the different codes created for family packs and price change labels create scanner conflict. The encoded tiles 188*a-b* correspond to packaging of an individual item in a family pack or the label bearing the GTIN of a product, before a price change. The encoded tiles 186*a-c* correspond to packaging of the family pack, such as a partial over-wrap or carrier. Encoded tiles 186*a-c* alternatively correspond to a price change label. The sequence of detection is likely to be as shown in FIG. 2, where the inner barcode of 188 is detected at T1 and then the outer barcode is detected at T2. This sequence of detection may not always happen, but in cases where different codes are detected from a package either within a frame, or over different frames, there is a need for code conflict resolution.

Figure 8B:
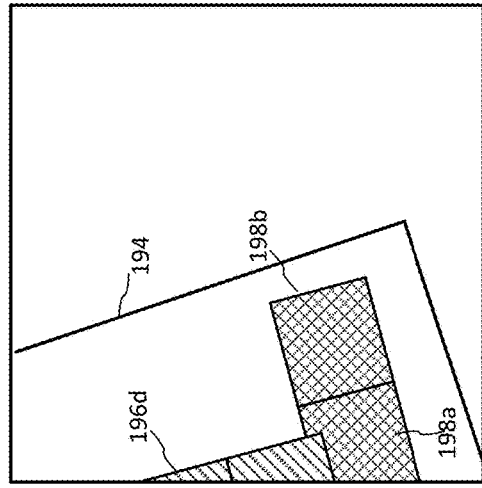
FIGS. 8A and 8B illustrate another example of image portions of an object in different frames captured from a field of view of a scanner's imager.
Figure 8A:
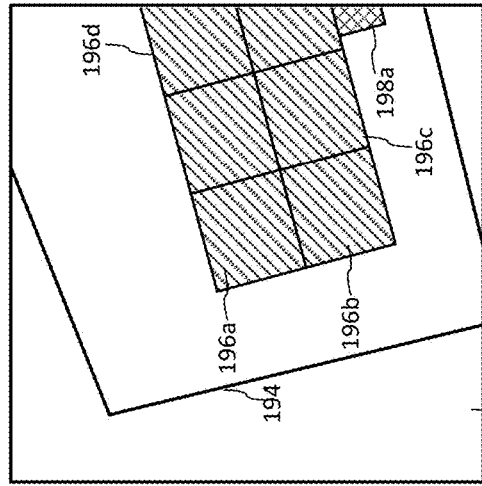

FIGS. 8A and 8B illustrate another example of image portions 190, 192 in different frames captured from a field of view of a scanner's imager. As the object 194 moves through the field of view, an outer barcode is likely to be detected first, but later, the inner barcode is likely to be detected. In this scenario, an outer barcode is encoded in tiles 196*a-d*, and an inner barcode in tiles 198*a-b*. For family packs, the outer barcode is encoded in tiles 196*a-d* on the package of the overwrap, but the overwrap does not completely obscure the inner barcode, which is a barcode encoded in tiles 198*a-b* on an individual item or items within the family pack. For price change labels, the price change is encoded in 196*a-d*, e.g., on a label affixed to the package 194 over the original packaging. The original packaging, however, retains encoding of the original item's GTIN in tiles 198*a-b*. The sequence of detection of outer than inner barcode of FIG. 3 is likely to happen in this case. At time T1, a recognition unit is likely to detect the payload of tiles 196*a-d*, and likely not 198*a*. At time T2, the recognition unit is likely to detect the payload of tiles 198*a-b*. This scenario poses a conflict if the scanner were to report the GTIN of the inner barcode separately from the family pack. Further, in some price change label scenarios, the scanner needs to detect that it should not report the original GTIN, as this would not reflect the price change correctly.

Figure 9:
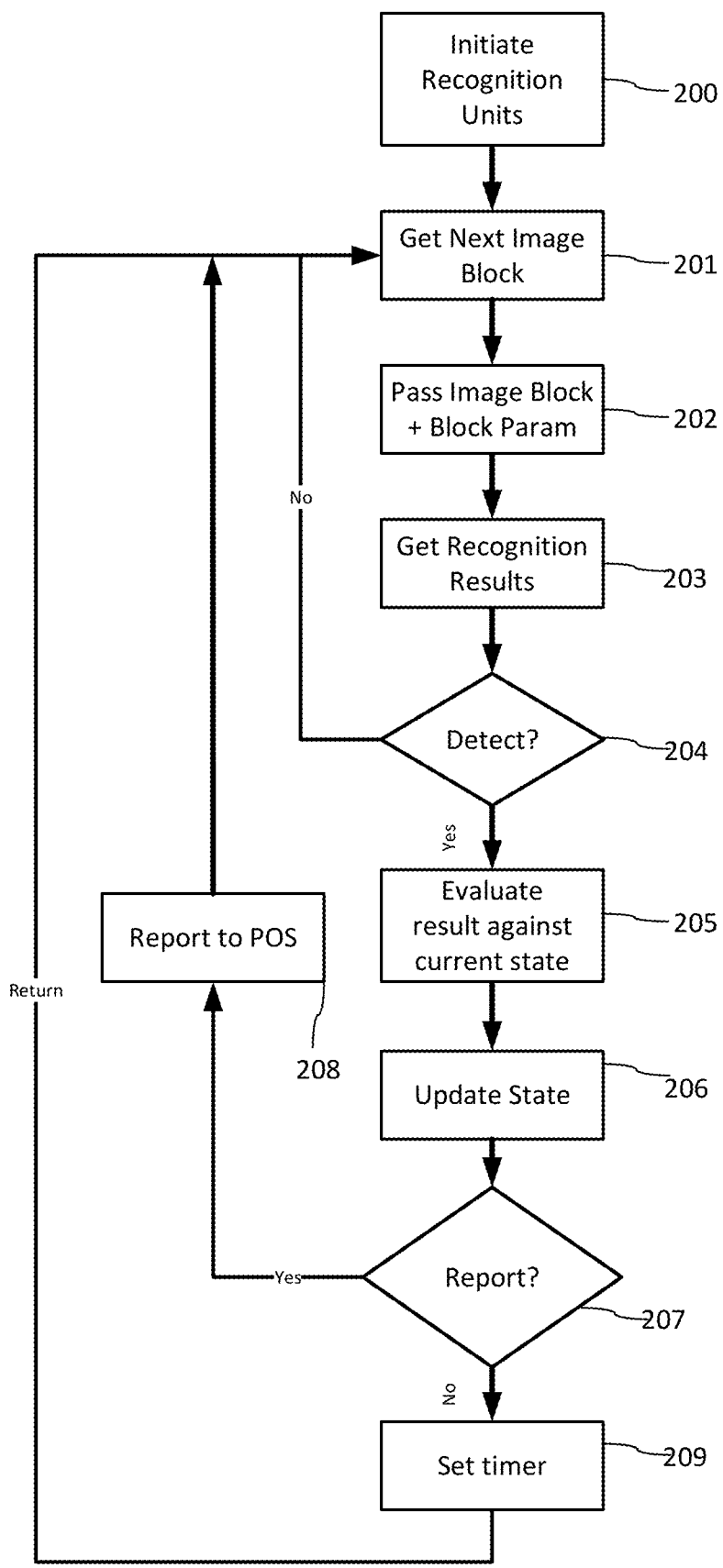
FIG. 9 is a flow diagram of a controller process that resolves product identification conflicts.

FIG. 9 is a flow diagram of a controller process that resolves these potential code conflicts. Preferably, this control logic is implemented within the controller 140 of FIG. 5. However, it may also be distributed between the controller 140 and one or more recognition units (e.g., 142, 144, 146). In particular, a recognition unit may implement control logic for resolving conflicts among codes that it detects during scanning operation, and report a subset of codes to a controller 140 for which conflicts have been resolved. The controller, in turn, receives recognition results from plural different recognition units and executes control logic to resolve conflicts among the recognition results from these recognition units.

One particular software architecture in which this control logic is implemented is the architecture illustrated in FIG. 6. In this implementation, the control logic is implemented as software instructions within a controller software process 160 executing on a processor (102, 102a or 108) of the scanner. The recognition unit 162 is a software process executed on that processor or different processor within the scanner.

As shown in step 200, the controller begins by initiating the recognition units. The recognition units (e.g., 142-146) are launched as instances of software processes executing on a processor within the scanner.

The controller issues instructions to the imager 110 via the imager interface and the illumination driver 116 to coordinate image capture and illumination as objects are scanned. The imaging interface 108 captures image data from the image 110 for a frame, buffers it in a RAM memory and signals the controller that new image block is available. This RAM memory may be within the interface 108 or in RAM memory 104. In steps 201-202, the controller gets an address of an image block in this RAM memory and passes the address to a recognition unit, along with additional attributes of that image block useful in assisting recognition operations (such as the view or camera that the image block came from, its geometric state (e.g., orientation of the view), frame identifier, and the like). In response, the recognition unit proceeds to obtain and perform recognition operations on the image block. For decoding of Digimarc Barcode data carriers repeated in contiguous tiles, a watermark processor executes decoder operations on the image block to search for an encoded data carrier and extract its payload from one or more of these encoded tiles, if detected. Plural instances of watermark processors may be assigned to process image blocks of different frames, as shown in FIG. 6.

The controller gets recognition results from the recognition units as shown in step 203. The controller queries a recognition unit to get its recognition result. It then evaluates the result to determine whether it has successfully recognized an object and has provided its item identifier (e.g. a GTIN, price code identifier or like item identifier), as shown in decision block 204. If not, it passes the next image block to the recognition unit (back to 201-202).

If the controller has obtained an item identifier, it evaluates the identifier against other identifiers obtained from the frame and prior frames during a pending time out period in step 205. This evaluation includes a comparison of the detected identifier with other identifiers from the same frame or prior frame stored in a state data structure.

If it is a new identifier, it is stored in a state data structure in shared memory of the controller process and analyzed further to determine whether to report it or initiate a waiting period to report it. If it has identified the identifier as a duplicate identifier with another identifier in a pending duplicate time out period, it is rejected as a duplicate.

For the evaluation executed in step 205, the controller retains state information for identifiers. Upon detection of a new identifier, the controller checks whether it is flagged, or has otherwise been detected as a family pack, family pack member or price change label. A family pack or family pack member is signaled via a flag decoded from the data carrier encoded on the object. Likewise, a price change label is similarly indicated by a flag. Alternative means of detecting family packs, family pack member items, and price change labels may be used in place of the flag or in addition to a flag, as described in this document (e.g., by label geometry, color, recognized image feature set or label template, etc.).

The detection of a family pack causes the controller to update the state by storing the family pack identifier in a state data structure and initiating a waiting period. The family pack identifier is queued for reporting at this point, as there is no need to wait to report it. Instead, this waiting period is used to prevent reporting an identifier of a member of the family pack for detections during waiting period initiated upon detection of the family pack. The waiting period is implemented using a timer as explained below. A duplicate time out period has a different objective from that of a waiting period to resolve a conflict. As such, it may be preferred to instantiate separate timers for duplicate and conflict rejection.

The detection of a new family pack member causes the controller to check whether a family pack identifier with a pending waiting period is in a state data structure. The pending waiting period is indicated by the timer for the waiting period not being in time out state when queried for an update. If family pack is in a waiting period, the family pack member is not reported. If a family pack is not in a waiting period, the controller updates the state data structure by storing the family pack member's identifier and initiating a waiting period for it. This family pack member waiting period is used to instruct the controller to wait to determine whether a family pack identifier is detected in the waiting period. It may also be used for duplicate rejection. If a family pack identifier is detected in this family pack member waiting period, the family pack identifier is stored in a state data structure and is queued for reporting (there is no need to wait on reporting). Additionally, the family pack member is stored in a state data structure for duplicate rejection, and a family pack waiting period is initiated for the family pack identifier by setting a timer for a family pack waiting period.

There are at least two types of price change labels: new fixed price and discount labels. When the controller finds a detection result with a new fixed price flag set, it stores the new fixed price code and queues it for reporting. From a reporting perspective, the controller reports the new fixed price instead of the original product identifier (GTIN) decoded from the same object. The scanner determines whether an identifier is from the same object by proximity in detection time or detection location of the price change label relative to the original product identifier (GTIN). Proximity in detection time is implemented based on a waiting period.

In an implementation where new fixed price labels are employed, a waiting period is imposed for new identifiers detected because of the possibility that detection of a new fixed price label may replace the GTIN that the controller reports to the POS terminal. When a new product identifier is detected, and there is no waiting period for a new fixed price code in a state data structure, the new identifier is retained and a waiting period is initiated to determine whether a fixed price label is detected in that ensuing waiting period. If a new fixed price code is detected first before the original product identifier on the object, meaning that no product identifier is in a waiting period state in the state data structure, the new fixed price code is queued for reporting. Subsequent product identifiers in the waiting period are not reported, but may be stored for duplicate rejection.

For a detected discount code, the controller stores the discount code in a state data structure and queues it for reporting. The scanner logic determines whether a product identifier is detected from the same object as noted in the previous case, e.g., by proximity in detection time and/or position in frame(s) relative to the discount label. If a product identifier from the same object is in the state data structure under its waiting period, the detected discount code is reported along with it. The discount code is stored for duplicate rejection, but is reported only once. If a discount is detected first, with no product identifier in a pending waiting period, the controller stores it in the state data structure and initiates a waiting period. It is reported if a new product identifier is detected in its waiting period. Since the discount should be associated with a product identifier, the controller may flag the POS terminal to have the checker scan or otherwise enter the product identifier of the product to which the discount code applies.

In step 206, the controller updates the state data structure with the identifier and status of an identifier (including product or price change codes), including state associated with family pack or price change detection results. It also calls a timer instance, if one has been initiated, to get its count and update the status of the timer as timed out, or still pending. It may also retain other information helpful in resolving conflict among detected items. This information may include a frame identifier or time code to indicate where an identifier originated from within a frame or a time of the frame in which it was detected. This information may also include position information, such orientation parameters and/or spatial location within a frame from which the identifier was extracted. In cases where different identifiers are detected within a frame, or within frames within a waiting period, the positional information may be used to determine that identifiers are from items that are to be priced separately, and as such, both reported to the POS. For example, if the identifiers originate from different frame locations and have tile orientation that is inconsistent, then they are candidates of being from separate objects, and handled as such by the controller.

In decision step 207, the controller determines whether to report the identifier or identifiers in the state data structure. The decision is based on state of the identifiers in the data structure and the state of the timer used to track a waiting period that has been initiated. The controller reports an identifier, including price change codes, for which a waiting period has not been imposed, or the waiting period to report has timed out. Time out periods used only for duplicate rejection do not require a waiting period for reporting. However, potential conflicts arising from family pack or price changes may require a waiting period as described above. The controller determines whether an identifier is in a waiting period by checking the state data structure to check whether the timer instance for a waiting period has timed out. In some cases, another detection will trigger a report, prior to a timer getting to a time out state. In this case, the controller has updated the state data structure to signal that an identifier is in a state to be reported, or ignored. If it determines to report, the controller transmits the identifier(s) to the POS terminal via the scanner's communication interface as shown in block 208.

In the next step 209, the controller sets up a timer for a waiting period, if necessary, for this pass through the controller process. The timer may be implemented with a soft timer, a software process such as a C++ timer object, which in turn, interfaces with a timer interrupt service available in the scanner's operating system. In this approach, the timer creates a timer instance for a waiting period. The timer instance invokes the timer interrupt service to update its count. The time interrupt services exposes a counter in the scanner hardware, e.g., as part of the ARM or other processor sub-system in the scanner. For flags that signal the start of a waiting period, such as a family pack or member of family pack, a new timer is initiated for that family pack related waiting period. The same is true for price change related waiting periods.

FIG. 9 depicts an example of a sequence of operations of a controller implementation. The sequence of operations may vary from the one depicted here. For example the timer may be set within the set of instructions that execute the update to the state of 206.

As noted, code conflict logic may be implemented within each recognition unit, and at the level of the controller. Conflict logic within a recognition unit is employed to resolve conflict among codes of the same type detected by the recognition unit. For example, in the case where plural conflicting codes of the same type are present on a package, the recognition unit employs code conflict logic to prevent reporting an erroneous code to the controller, and ultimately, to prevent the scanner from reporting an improper code to the POS system.

In one embodiment, the recognition unit writes its detection results to a data structure and returns the data structure (or pointer to it) when the controller queries it for detection results. The recognition unit records the state of detection results in the data structure, including whether a detected identifier is in a waiting period and whether a detected identifier is in a potentially conflicted status with another identifier. When plural different codes of the same symbology and type are detected within a frame, they are recorded as potentially conflicting. This may occur where there are two different GTINs without a family pack or price code relationship to justify the existence of the different GTINs. A waiting period is initiated for each code. For subsequent codes detected within the waiting period, the recognition unit updates the data structure. The recognition unit may be able to resolve the conflict based on detection results within the waiting period that confirm that one identifier should be given priority over another. For example, subsequent detection of one of the identifiers in subsequent image frames of a package within the waiting period may be sufficient to confirm that one identifier has priority and should be reported as such through the state data structure. Alternatively, the conflict may not be resolved, and instead, the recognition unit reports potentially conflicting identifiers on a package to the controller via a pointer to the data structure.

In response, the controller either resolves the conflict based on detection results from another recognition unit and reports the highest priority identifier or reports an error to the POS system. For example, a GTIN in a barcode of one type reported from one recognition unit may agree with a GTIN in a different symbology reported from another recognition unit. For results within a waiting period, the controller compares the detection results from different recognition units and determines, based on matching the GTINs from different symbologies, that a conflicting GTIN can be excluded and the matching GTIN given priority. The controller then reports the higher priority GTIN. Alternatively, if a conflict persists or is not resolved, the controller signals an error to the POS system and prompts a re-scan, or manual entry. The re-scan may be switched to a presentment mode rather than a scan and pass mode so that the user can present the correct code for scanning.

This approach for integrating recognition units in scanners enables the recognition units to be updated over time while maintaining the same interface with the scanner and the interface to its controller. Specifically, recognition units can become more sophisticated in detection performance, detection result and state reporting, and conflict logic. These updates are reflected in updates to the contents of the data structure, which provide more detail of the context of the detection of each identifier (e.g., location, time of detect, number of detects, waiting period state) as well as recommended reporting logic (e.g., reporting an instruction to the controller to hold for waiting period, resolve conflict between codes A, B, etc., or seek to confirm detection result with result of another recognition unit). The scanner may be updated on a different schedule without concern of becoming incompatible with the recognition unit, as the data structure is configured to include a detection result that is backward compatible. An older version of a controller continues to interpret simpler results as before, e.g., report GTIN, wait, or error. In contrast, a new version of the controller is preferably updated to interpret error or wait states in the extended data structure, as an instruction to read and resolve potential code conflicts identified in the extended data structure.

Preferably, the recognition unit updates are provided with helper source code that provide scanner manufactures guidance on how to exploit the additional detection result data and code conflict logic implemented by the recognition unit and reported in the extended data structure it returns.

Signal Encoder and Decoder

Figure 10:
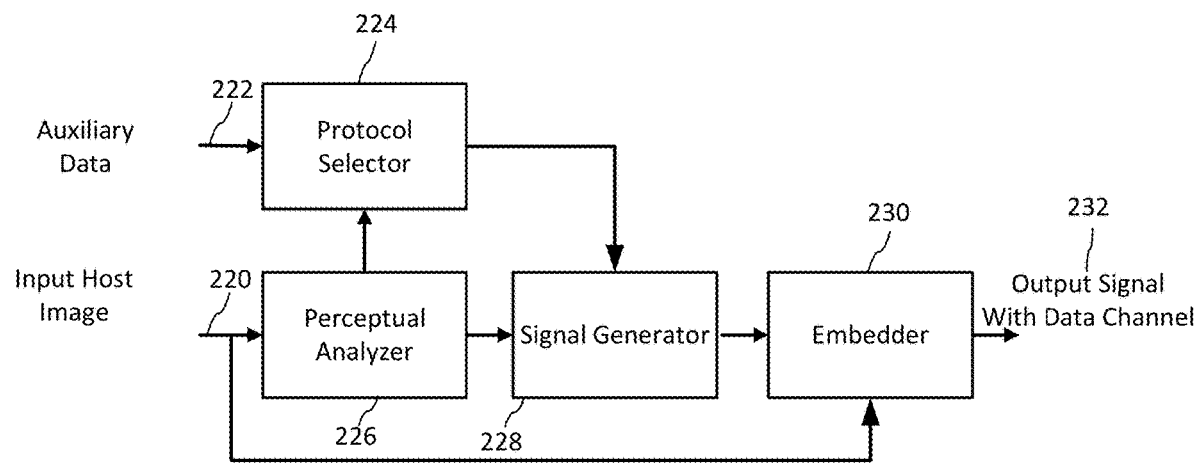
FIG. 10 is a block diagram of a signal encoder for encoding a digital payload signal into an image signal.
Figure 11:
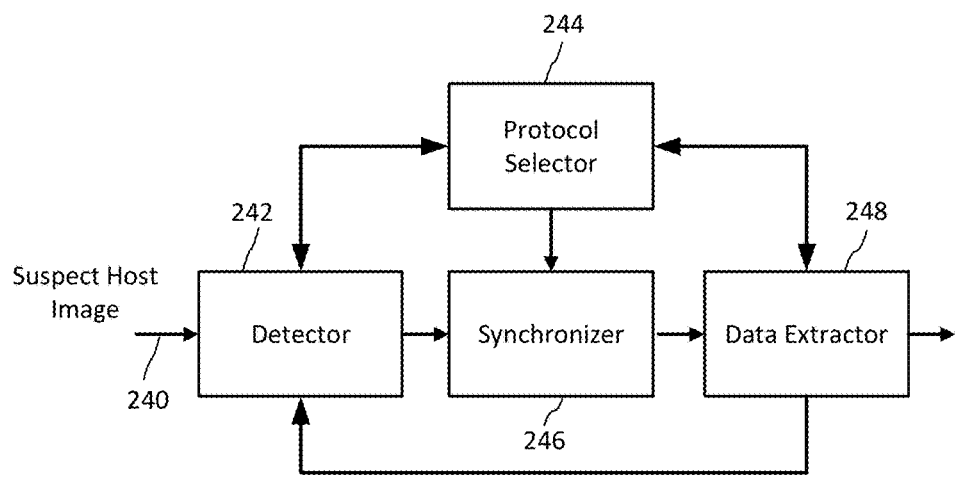
FIG. 11 is a block diagram of a compatible signal decoder for extracting the digital payload signal from an image signal.

FIG. 10 is a block diagram of a signal encoder for encoding a digital payload signal into an image signal. FIG. 11 is a block diagram of a compatible signal decoder for extracting the digital payload signal from an image signal.

While the signal encoder and decoder may be used for communicating a data channel for many applications, the objective for use in physical objects is robust signal communication through images formed on and captured from these objects. Signal encoders and decoders, like those in the Digimarc Barcode Platform from Digimarc Corporation, communicate auxiliary data in a data carrier within image content.

Encoding and decoding is applied digitally, yet the signal survives digital to analog transformation and analog to digital transformation. For example, the encoder generates a modulated image that is converted to a rendered form, such as a printed image. Prior to decoding, a receiving device has an imager to capture the modulated signal, convert it to an electric signal, which is digitized and then processed by the decoder.

Inputs to the signal encoder include a host image 220 and auxiliary data payload 222. The objectives of the encoder include encoding a robust signal with desired payload capacity per unit of host signal (e.g., the spatial area of a two-dimensional tile), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., US Published Application No. 20160275639, entitled SPARSE MODULATION FOR ROBUST SIGNALING AND SYNCHRONIZATION, incorporated herein by reference.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and synchronization method and signals.

The protocol defines the manner in which the signal is structured and encoded for robustness, perceptual quality or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 156 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (issued as U.S. Pat. No. 9,380,186) and Ser. No. 14/588,636 (issued as U.S. Pat. No. 9,401,001) and U.S. Pat. Nos. 9,449,357, 9,117,268 and 7,352,878, which are hereby incorporated by reference.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator produces a data signal with data elements that are mapped to embedding locations in a tile. These data elements are modulated onto the host image at the embedding locations. A tile is a pattern of embedding locations. The tile derives its name from the way in which it is repeated in contiguous blocks of a host signal, but it need not be arranged this way. In image-based encoders, we use tiles in the form of a two dimensional array (e.g., 128 by 128, 256 by 256, 512 by 512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. See, e.g., U.S. Pat. Nos. 9,449,357 and 9,401,001, and US Published Patent Application No. US 2016-0316098 A1, which are hereby incorporated herein by reference.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., Digimarc's U.S. Pat. Nos. 9,449,357, 9,401,001, 9,380,186, 9,117,268 and 7,352,878, which are each hereby incorporated herein by reference in its entirety.

The embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., U.S. Pat. Nos. 9,380,186, 9,401,001 and 9,449,357, which are each hereby incorporated herein by reference, for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference, and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 11, the signal decoder receives an encoded host signal 240 and operates on it with one or more processing stages to detect a data signal, synchronize it, and extract data. This signal decoder corresponds to a type of recognition unit in FIG. 5 and watermark processor in FIG. 6.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules are implemented as software instructions executed within the scanner, an FPGA, or ASIC.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 12:
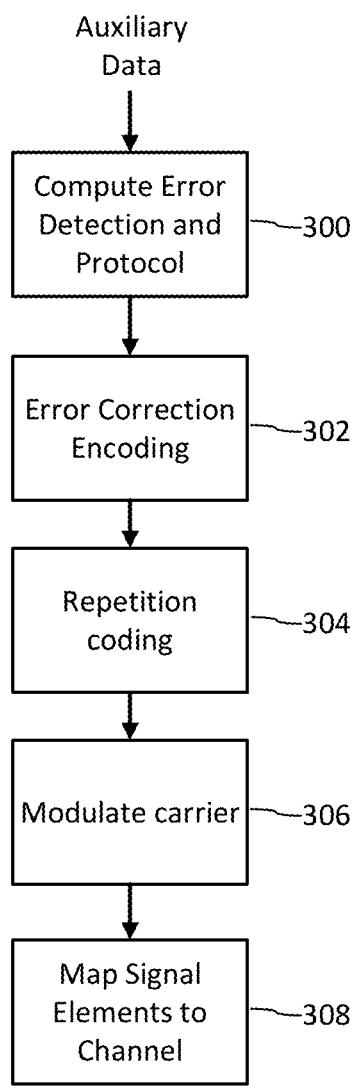
FIG. 12 is a flow diagram illustrating operations of a signal generator.

FIG. 12 is a flow diagram illustrating operations of a signal generator. Each of the blocks in the diagram depict processing modules that transform the input auxiliary data (e.g., GTIN or other item identifier plus flags) into a digital payload data signal structure. For a given protocol, each block provides one or more processing stage options selected according to the protocol. In processing module 300, the auxiliary data payload is processed to compute error detection bits, e.g., such as a Cyclic Redundancy Check, Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (⅓ rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder must be able to extract estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our previously cited U.S. Pat. Nos. 6,614,914, and 5,862,260.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference.

Our U.S. Pat. No. 9,182,778, which is hereby incorporated by reference, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and US Published Patent Application No. 20160217547, which are hereby incorporated by reference in their entirety.

Signal Embedding in Host

Figure 13:
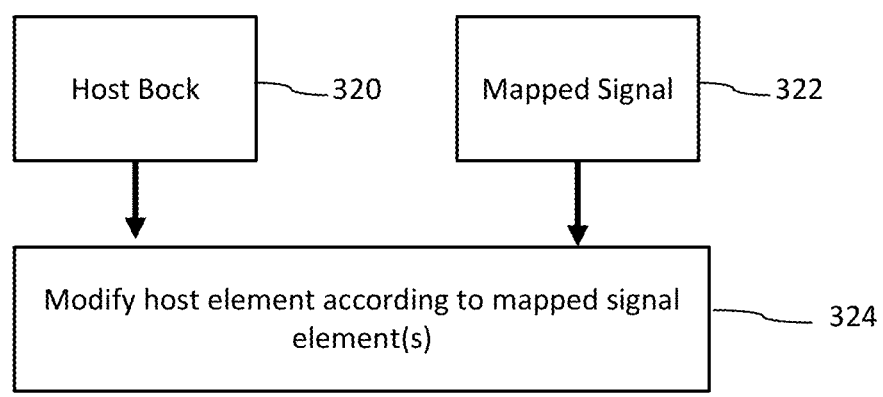
FIG. 13 is a diagram illustrating embedding of an auxiliary signal into host image signal.

FIG. 13 is a diagram illustrating embedding of an auxiliary signal into host signal. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added, or added separately with separate mask coefficients to control the signal amplitude independently.

Applying the method of FIG. 12, the product or label identifier (e.g., in GTIN format) and additional flag or flags used by control logic are formatted into a binary sequence, which is encoded and mapped to the embedding locations of a tile. For sake of illustration, we describe an implementation of a tile having 256 by 256 embedding locations, where the embedding locations correspond to spatial domain embedding locations within an image. In particular, the spatial locations correspond to pixel samples at a configurable spatial resolution, such as 100 or 300 DPI. In this example, we will explain the case where the spatial resolution of the embedded signal is 300 DPI, for an embodiment where the resulting image with encode data is printed on a package or label material, such as a paper, plastic or like substrate. The payload is repeated in contiguous tiles each comprised of 256 by 256 of embedding locations. With these embedding parameters, an instance of the payload is encoded in each tile, occupying a block of host image of about 1.28 by 1.28 inches. These parameters are selected to provide a printed version of the image on paper or other substrate. At this size, the tile can be redundantly encoded in several contiguous tiles, providing added robustness. An alternative to achieving desired payload capacity is to encode a portion of the payload in smaller tiles, e.g., 128 by 128, and use a protocol indicator to specify the portion of the payload conveyed in each 128 by 128 tile. Erasure codes may be used to convey different payload components per tile and then assemble the components in the decoder, as elaborated upon below.

Following the construction of the payload, error correction coding is applied to the binary sequence. This implementation applies a convolutional coder at rate 1/4, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in US Published Patent Application no. 20160217547, incorporated above. In the latter, the tile size may be increased to accommodate the differential encoding of each encoded bit in a pattern of differential encoded bit cells, where the bit cells corresponding to embedding locations at a target resolution (e.g., 300 DPI).

Our published US Patent Application No. 20160275639, incorporated above, describes methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in our prior work, such as our U.S. Pat. Nos. 6,614,914, 5,862,260, 6,674,876, and 9,117,268, which are hereby incorporated by reference, and US Patent Publication No 20160275639, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits output from an implementation of stage 304 of FIG. 5. These bits are modulated onto a pseudo-random carrier to produce watermark signal elements (block 306 of FIG. 12), which in turn, are assigned to the pseudorandom embedding locations within the sub-blocks (block 308 of FIG. 12). An embedder module modulates this signal onto a host signal by increasing or decreasing host signal values at these locations for each error correction coded bit according to the values of the corresponding elements of the modulated carrier signal for that bit.

Figure 14:
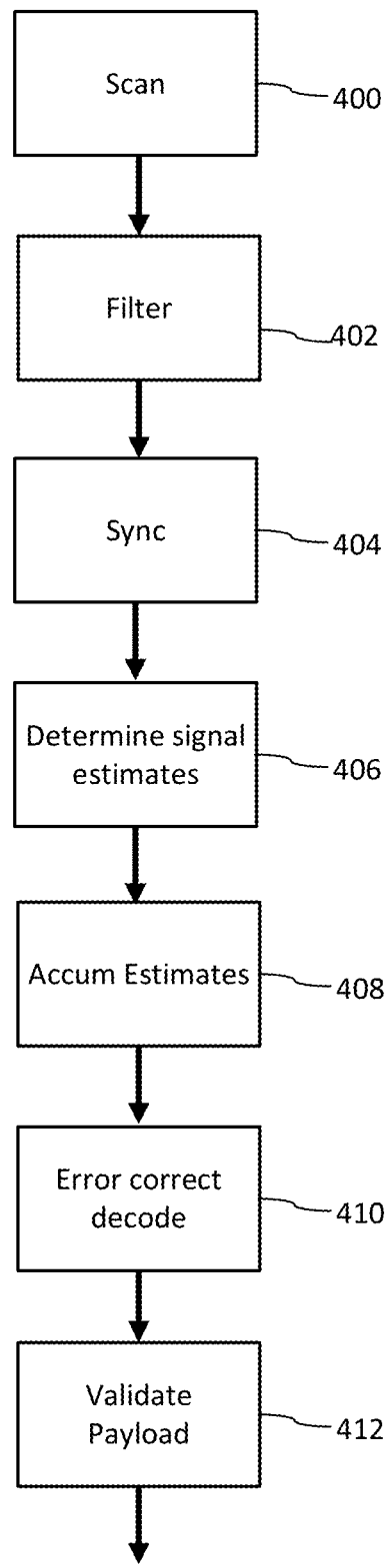
FIG. 14 is a flow diagram illustrating a method for decoding a payload signal from a host image signal.

FIG. 14 is a flow diagram illustrating a method for decoding a payload signal from a host image signal. This method is a particular embodiment of a recognition unit of FIG. 5, and a watermark processor of FIG. 6. Implementations of recognition unit and watermark processors available from Digimarc Corporation include:

Digimarc Mobile Software Development Kit; and
Digimarc Embedded Systems SDK.

The Embedded Systems SDK is the one typically integrated into scanner hardware.

Corresponding encoder embodiments available from Digimarc Corporation include:

Digimarc Barcode SDKs
Digimarc Barcode Plugin

Returning to FIG. 14, the frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see co-pending U.S. Pat. No. 9,521,291, which is hereby incorporated herein by reference.

Please also see US Published Patent Application No. US 2016-0364623 A1, which is hereby incorporated herein by reference, for more on block selection where processing is time is more limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., U.S. Pat. No. 9,117,268 for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in our Patent Application Publication 2013-0329006, entitled COORDINATED ILLUMINATION AND IMAGE SIGNAL CAPTURE FOR ENHANCED SIGNAL DETECTION, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, 20120078989, which are hereby incorporated by reference.

For more on filters, also see U.S. Pat. No. 7,076,082, which is hereby incorporated by reference. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of 20120078989 to recover rotation and scale of a synchronization signal comprised of peaks in the Fourier domain. To recover translation, the phase correlation method of U.S. Pat. No. 6,614,914 is used, or phase estimation and phase deviation methods of U.S. Pat. No. 9,182,778, which is hereby incorporated herein by reference, are used.

Alternative methods perform synchronization on an implicit synchronization signal, e.g., as detailed in published application no. 20160217547.

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412). The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

Recognition Unit Employing Image Recognition

The scanner may also include a recognition unit that implements an image recognition method for identifying a product in a store's inventory as well as product labels, such as price change labels. In such a system, reference image feature sets of each product are stored in a database of the scanner's memory and linked to an item identifier for a product and/or particular label (e.g., price change label). The recognition unit extracts corresponding features from an image frame and matches them against the reference feature sets to detect a likely match. If the match criteria are satisfied, the recognition unit returns an item identifier to the controller. The recognition unit may also return spatial information, such as position, bounding box, shape or other geometric parameters for a recognized item to enable the controller to detect whether a code from another recognition unit is from the same object.

One form of recognition system is an image fingerprint-based system. SIFT, SURF, ORB and CONGAS are some of the most popular algorithms. SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293, which is hereby incorporated herein by reference.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are invariant to image scale, rotation and affine transformation. They are also robust to changes in illumination, noise, and some changes in viewpoint. In addition to these properties, they are distinctive, relatively easy to extract, allow for correct object identification with low probability of mismatch and are straightforward to match against a (large) database of local features. Object description by set of SIFT features is also robust to partial occlusion; as few as 3 SIFT features from an object can be enough to compute location and pose.

The technique starts by identifying local image features—termed keypoints—in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient are calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with $\sigma$ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints at different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with $\sigma$ 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25%—to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure, suitable for implementation in a next generation cell phone, is Bonato et al, "Parallel Hardware Architecture for Scale and Rotation Invariant Feature Detection," IEEE Trans on Circuits and Systems for Video Tech, Vol. 18, No. 12, 2008.

An alternative hardware architecture for executing SIFT techniques is detailed in Se et al, "Vision Based Modeling and Localization for Planetary Exploration Rovers," Proc. of Int. Astronautical Congress (IAC), October, 2004.

While SIFT is a well-known technique for generating robust local descriptors, there are others. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005) and SURF (c.f., Bay et al, SURF: Speeded Up Robust Features," Eur. Conf. on Computer Vision (1), pp. 404-417, 2006; Chen et al, "Efficient Extraction of Robust Image Features on Mobile Devices," Proc. of the 6.sup.th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008).

ORB refers to Oriented Fast and Rotated BRIEF, a fast local robust feature detector. For information about it, please see, Ethan Rublee, Vincent Rabaud, Kurt Konolige, Gary Bradski "ORB: an efficient alternative to SIFT or SURF", Computer Vision (ICCV), 2011 IEEE International Conference on. IEEE, 2011.

Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision—ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

In our related work, we describe methods for 3D object recognition based on capture of 2D images. See assignee's US Application Publication 2015-0016712, METHODS FOR OBJECT RECOGNITION AND RELATED ARRANGEMENTS, which is hereby incorporated by reference.

As alternatives, several other object recognition schemes are documented in published papers, and are incorporated by reference herein. The object recognition techniques in the following can be adapted for identifying products in a store's inventory:

Fei-Fei et al, A Bayesian Hierarchical Model for Learning Natural Scene Categories, IEEE Conference on Computer Vision and Pattern Recognition, 2005;

Ohbuchi, et al, Distance Metric Learning and Feature Combination for Shape-Based 3D Model Retrieval, Poster Presentation, Proc. of the ACM workshop on 3D Object Retrieval, 2010.

Lian, et al, Visual similarity based 3D shape retrieval using bag-of-features, IEEE Shape Modeling International Conference 2010; and Ohbuchi, et al, Accelerating bag-of-features SIFT algorithm for 3d model retrieval, Proc. SAMT 2008 Workshop on Semantic 3D Media; which are all hereby incorporated by reference.

Detection Trigger with Digital Watermarking and Other Symbologies

There are times where an encoded object (e.g., a retail package, label or product hang tag) needs to be interpreted in different ways, e.g., depending on symbologies detected, context and/or user intent. Consider FIG. 15, where an object (e.g., representing one face of a retail package) includes artwork, text, and various machine-readable symbologies. In the illustrated example, the artwork includes castles, sundial, shields, knight/horse, scenery, etc. The text includes "VALIANT", "For the courage to get deep down clean", "ICON Label", etc. And a 1D barcode and a 2D barcode. Of course, the object may include a subset of these items, and/or include additional or different printed features and graphics. Thus, the artwork depicted in FIG. 15 is for illustrative purposes and shouldn't limit the following discussion. The illustrated grid-like pattern (creating grid cells) virtually represents different encoding areas. That is, a grid would not typically be printed on a retail package, but is shown in FIG. 15 to help the reader visualize examples of multiple encoding areas. Moreover, encoding regions need not be rectangular in shape.

Machine-readable data may be redundantly encoded within two-dimensional spatial areas (e.g., within some or all of the grid cells) across an image to create an enhanced or transformed image with an auxiliary data signal. The encoding can be applied to an object during printing or labeling with commercial presses, or directly by applying encoding after artwork, text and barcodes have been laid down, with ink jet, laser marking, embossing, photographic, or other marking technology. Redundant marking is particularly useful for automatic identification of objects, as it is able to be merged with other imagery (instead of occupying dedicated spatial area like conventional codes) and enables reliable and efficient optical reading of the machine readable data from various different views of the object. In one embodiments, the encoding comprises digital watermarking (or a "digital watermark"). Digital watermarking as used in this patent document, refers to an encoded signal that carries a machine-readable (or decodable) code. In some embodiments digital watermarking is designed to be less visually perceptible to a human viewer relative to an overt symbology such as a visible 1D or 2D barcode or QR code. The following patent documents describe many suitable examples of digital watermarking, e.g., U.S. Pat. Nos. 6,102,403, 6,614,914, 9,117,268, 9,245,308 and 9,380,186, and US Publication Nos. 20160217547 and 20160275639, which are each hereby incorporated by reference in its entirety. The artisan will be familiar with others.

Returning to FIG. 15, the retail package includes an icon 550. An icon may include, e.g., a logo, shape, graphic design, symbol, etc. Icon 550 typically does not include a machine-readable signal encoded therein. The icon 550 may include associated text and/or be differently shaped than illustrated. That is, it need not be a hexagon, nor need it be internally grey-stippled. Icon 550 may be used as an indicator of information associated with the retail package, its contents or both. For example, icon 550 may be shaped and colored like a peanut to indicate a potential allergy or associated allergy information. In other cases icon 550 may be used as an age restriction indicator. For example, the icon may be a particularly stylized "R", perhaps placed within a colored shape (e.g., box), which can be used to indicate a suitability (or not) for children. In other cases, icon 550 includes a so-called SmartLabel label. SmartLabel was a collaborative effort to standardize a digital label format which consumers can use to access product information using their smartphones. The SmartLabel is typically associated with a visible QR code. The QR code is read (but not the icon) by a smartphone to access product information, e.g., nutrition, ingredients, allergens, in a consistent format. The SmartLabel label itself is used more as a visual cue to a shopper or consumer that related product information exists online. But, real estate on a product package is often limited. Branding information, graphics, nutrition information, 1D barcode, QR codes, etc. can take up a lot of space. E.g., consider a yogurt cup which has very limited space on the container surface. And even if a package is not tight on space, a QR code or other visible symbology can be an eyesore.

Use of an icon with machine-readable symbologies is discussed with reference to FIG. 16A. Image data 500 is captured by a camera or other image sensor. For example, a smartphone camera captures image data representing some or all of a product package (e.g., the package face shown in FIG. 15). One example of a suitable smartphone is discussed below relative to FIG. 19. A smartphone may represent captured image data in various ways. For example, a smartphone camera may output captured image data in RGB, RGBA or Yuv format. Thus, image data 500 can be variously represented. In our preferred embodiment, we use greyscale data for image data 500, e.g., the Y value from the Yuv, or converted luminance data from RGB data (e.g., Luma=0.2126*R+0.7152*G+0.0722*B). In some embodiments, image data 500 represents a cropped version of an image frame. For example, if image data includes 911×512 pixels, the center 400×400 pixels can be used. One purpose of cropping is to focus in on a center of the frame, which is likely the target of a captured image. In some other embodiments, image data 500 represents a filtered or processed version of captured image data.

Image data 500 is processed by a Signal Decoder 502, which may include, e.g., a barcode decoder, and/or an encoded signal decoder. One example of an encoded signal decoder is a digital watermark decoder. Image data 500 may represent a frame of imagery, portions of a frame, or streaming imagery, e.g., multiple frames. Signal Decoder 502 analyzes the image data 500 in search of an encoded signal, e.g., which carries a code, message or payload. For example, if the image data 500 includes digital watermarking encoded therein, the Signal Decoder 502 attempts to decode 504 the digital watermarking to obtain the code, message or payload. In one example, the code, message or payload includes a GTIN number, or other product identifier such as a UPC number. If no signal is successfully decoded, Signal Decoder 502 preferably moves on to analyze other image data, e.g., another image frame(s) or another image portion. In some cases, the Signal Decoder 502 may output (or set a flag representing) a message, e.g., "No Detect" or "no signal found", or the like.

If an encoded signal is successfully decoded, flow moves to an Icon Detector 506. Icon Detector 506 operates to detect 508 an icon, e.g., icon 550 (FIG. 15). We sometimes use the phrase "target icon" to mean a particular icon that is to be detected or a reference icon from which templates are determined. If an icon is not detected (but the encoded signal was), a first response is presented (e.g., "Response 1" in FIG. 16A). If an icon is detected (along with the encoded signal), a second response is presented (e.g., "Response 2"). Icon Detector 506 may be configured to search the same image data 500 for the icon. That is, icon 550 must be present in the same image frame (or image portion or streaming frames) as the encoded signal was found in or searched across to yield a successful "Response 2". In other cases, Icon Detector 506 is configured to detect icon 550 within a predetermined number of image frames (e.g., 2-5 frames) relative to the encoded signal decode, or within a certain time frame (e.g., within 1 second or less). In still a further cases, if an encoded signal is detected then only the icon detector runs for the next, e.g., n number of frames (e.g., 2-6 frames). In still other implementations, Signal Decoder 502 and Icon Detector 506 switch order of operations. That is, a target icon is searched for first and, only upon a successful icon detection, then is an encoded signal searched for. This alternative process is shown with respect to FIG. 16B. If an icon is detected (but the encoded signal was not), a first response is presented (e.g., "Response 1" in FIG. 16A). If an icon is detected (along with the encoded signal), a second response is presented (e.g., "Response 2"). Besides the order of operation, the technology shown in FIGS. 16A and 16B are the same.

Figure 16A:
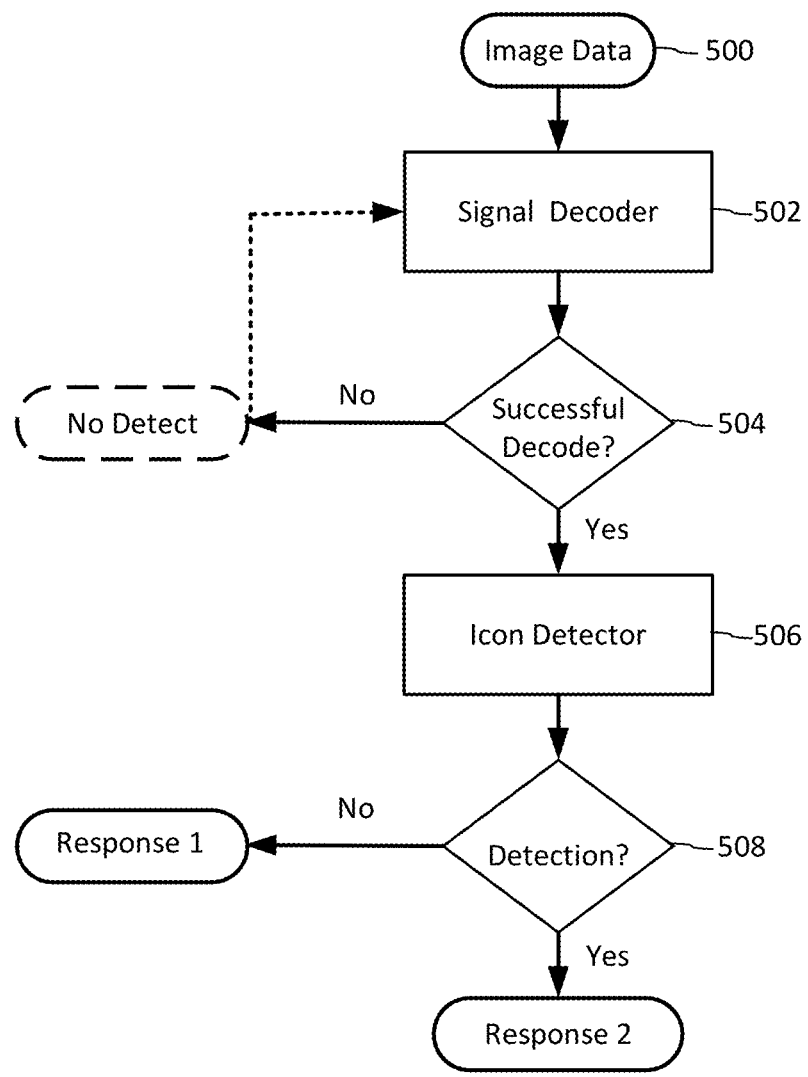
FIG. 16A is a flow diagram showing cooperation of a signal decoder and an icon detector.
Figure 16B:
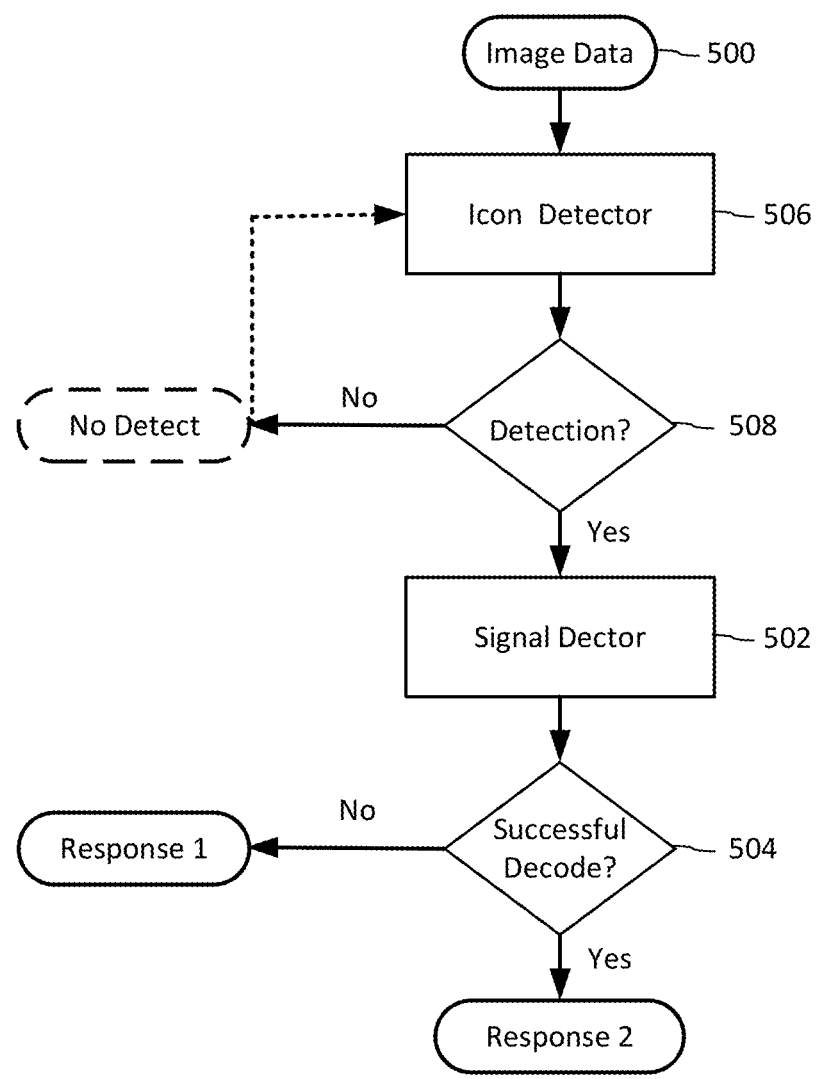
FIG. 16B is a flow diagram showing cooperation of an icon detector and signal decoder.
Figure 25A:
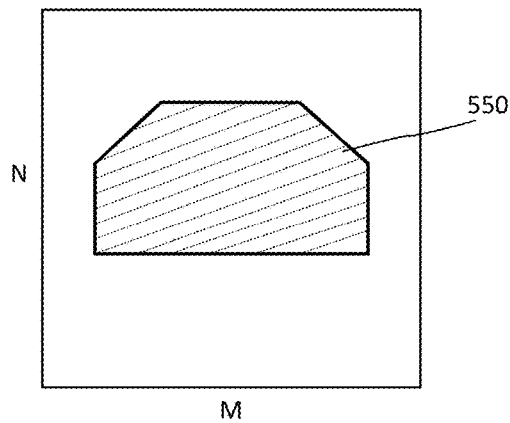
FIGS. 25A-25D show signal encoding in, on and around various icons.
Figure 25B:
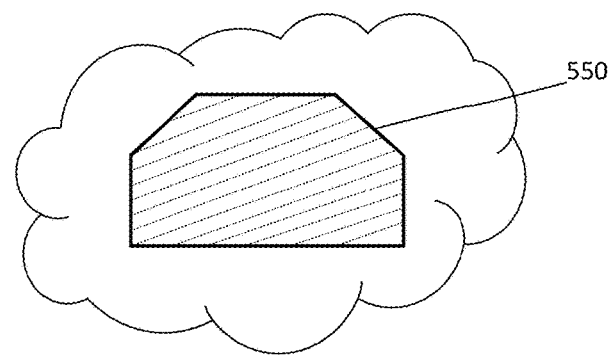

In another FIG. 16B embodiment, once an icon is detected, a localized encoded signal search is carried out. For example, and with reference to FIGS. 25A-D, an encoded signal is placed in or around a localized spatial area relative to an icon. In a first case, FIG. 25A, the encoded signal surrounds an icon, e.g., icon 550. The encoded signal can be provided in an N×M rectangular area, where N×M are measurement units such as in inches, dots per inch, centimeters, etc. The encoded signal can be redundantly provided in this N×M area, e.g., in a tiled-like manner. In some cases the icon will not include any encoding within its area, whereas in other cases the encoded signal will be provided within or on the icon. In one example, N corresponds to $\frac{1}{300}$ inch to 4 inches, and M corresponds to $\frac{1}{300}$ to 4 inches. Once an icon is detected, a signal decoder can initiate decoding of an area engulfing, surrounding or neighboring the detected icon. For example, the signal decoder can analyze image data within the N×M area. Of course, the encoded area is not limited to a rectangle. For example, a signal can be encoded within any number of areas including, e.g., the cloud shown in FIG. 25B. An image mask or layer can be used to confine the encoding to an area engulfing, surrounding or neighboring an icon. Preferably, the icon is surrounded or neighbored by an area having $\frac{1}{300}$ inch to 4 inches on all sides.

Figure 25C:
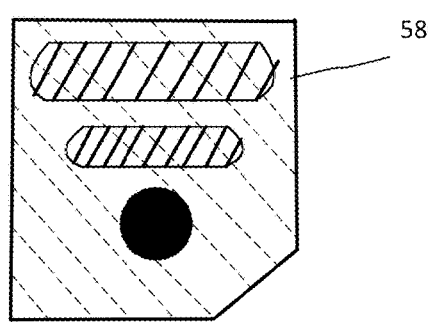
Figure 25D:
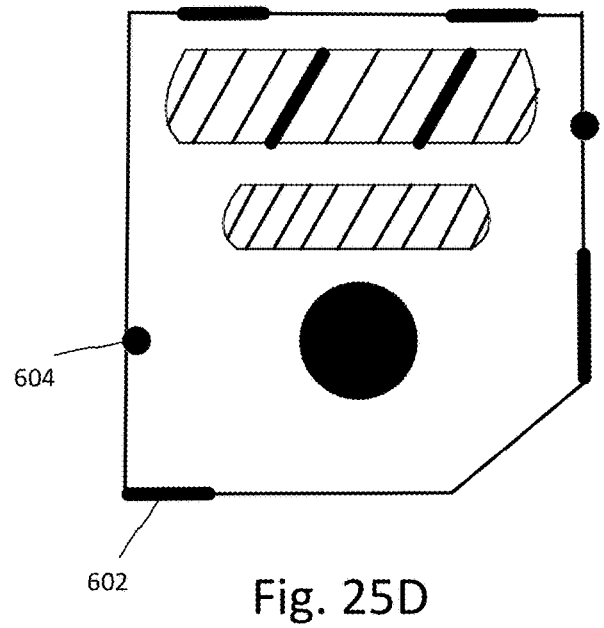

With reference to FIGS. 25C and 25D, some icons may designed so that they, themselves, can host encoded signals. The dashed lines in FIG. 25C represented a signal encoded within an icon, e.g., icon 580. For example, the encoding may be a relatively sparse signaling technology such as discussed in our US Published Patent Application Nos. US 2016-0275639 A1 and US 2017-0024840 A1, which are each hereby incorporated herein by reference in its entirety. Or, depending on the colors (if any) included within an icon, the color encoding technologies described in our U.S. Pat. Nos. 9,380,186 and 9,117,268, US Published Patent Application No. US 2016-0198064 A1, U.S. patent application Ser. No. 15/418,364 (U.S. Pat. No. 10,255,649), filed Jan. 27, 2017, and Ser. No. 15/261,005 (U.S. Pat. No. 10,304, 149), filed Sep. 9, 2016, can be employed. The U.S. Pat. Nos. 9,380,186, 9,117,268, US 2016-0198064 A1, U.S. Pat. Nos. 10,255,649, 10,304,149 are each hereby incorporated herein by reference in its entirety. Still other encoding techniques may be used to encode an icon itself. For example, a line contour change, line width modulation (LWM), Line Continuity Modulation (LCM), Line Angle Modulation (LAM), Line Frequency Modulation (LFM), Line Thickness Modulation (LTM), or a combination of these technologies can be used, e.g., as described in assignee's US Patent Application No. US 2016-0189326 A1, which is hereby incorporated herein by reference in its entirety. Returning to FIG. 25D, a LWM or LTM technique is shown by reference no. 602, with a line contour change shown by reference no. 604.

Once an icon is detected (in a FIG. 16B implementation), image data surrounding, corresponding to, neighboring or engulfing the icon can be analyzed to decode an encoded signal. In some cases, a window (or other area define imagery) around (and/or including) the detected icon is searched. The window can be expanded if an initial analysis does not decode an encoded signal. For example, the window may include $\frac{1}{300}$ to 2 inches around the icon. If a signal is not decoded, the area can be expanded from 2-4 inches.

We envision that the FIGS. 16A and 16B process may operate on a smartphone, e.g., as depicted in FIG. 19. A smartphone may, at times, be concurrently (or serially) executing multiple different image and/or audio signal processing operations. For example, data from an image pipeline (e.g., providing image data collected by a camera) may be analyzed to detect 1D barcodes, 2D barcodes, encoded signals, and/or icons. The pipeline data may also be analyzed for optical character recognition and/or image recognition. Prioritizing these different operations and their corresponding output (e.g., decode identifiers, detection indications and/or corresponding responses) can be tricky. One approach sets a predetermined time or frame count before providing a response (e.g., a UI indication of a successful read). For example, if a 1D barcode is detected at time 0 seconds, then a response will not be provided until x seconds (or milliseconds) from time 0 seconds. Image signal processing analyzes continues during this time frame to determine whether any other codes, icons, character or image features can be decoded, detected or recognized. If more than one (1) code is detected or decoded then a prioritization can be consulted. For example, it might be determined that an icon takes precedence over all other codes or symbols, so only information associated with a successful icon detection is presented. Or, maybe a QR 2-D barcode is ranked highest, so only a response associated with the QR code is provided. Or, still further, a prioritization may indicate which response to display first, second, third and so on. Further scheduling and prioritization methods and apparatus, which can be advantageously used in the present context, are described in assignee's US Published Patent Application Nos. 20110212717, 20110161076 and 20120284012, which are each hereby incorporated herein by reference in its entirety. Regarding the 20120284012 application, see, e.g., the section headings entitled "Evidence-Based State Machines, and Blackboard-Based Systems" and "More on Middleware, Etc.".

Returning more particularly to icon detection, and in another embodiment relative to the package example in FIG. 15, a retail package includes an encoded signal redundantly provided over its surface. For example, the package may include redundant instances of digital watermarking carrying a GTIN number in each of the grid cells (or a subset of the grid cells). Preferably, the encoding (e.g., digital watermarking) is included on all sides of the package. The package also includes an icon 550, which indicates the presence of additional information associated with the package or package contents, e.g., online information. Icon 550 may be even located near a nutrition text box printed on the package (text box not shown in FIG. 15). A smartphone camera captures image data representing a portion of the package which includes both i) the encoded signal, and ii) icon 550. The image data is provided to the process detailed in FIG. 16A. In this scenario, the encoded signal is decoded along with icon 550 being detected, triggering a certain response (e.g., "Response 2" in FIG. 16A). The certain responses can cause the smartphone to provide, e.g., access to the additional information. For example, the networks, data stores and cloud-based routing described in assignee's U.S. Pat. No. 8,990,638, which is hereby incorporated herein by reference in its entirety, can be used to provide access to the additional information. (In one implementation, a remote database includes a response table or database. The table or database may include multiple responses per encoded signal identifier. If the identifier is received without an icon detection indication, then a Response 1 is provided. But, if the identifier is received with an icon detection indication, then a Response 2 is provided.) In some cases, the certain response is limited to access to the additional information. And, even though the encoded signal may carry a certain payload like a GTIN, such information preferably is not provided for user or application access. In this first scenario, it is assumed that there is an interest in the additional information since the icon 550, which indicates the ability to access additional information, was detected. Therefore, the response (e.g., "Response 2") is limited to providing access to the additional information, and not, e.g., the GTIN itself.

In a second embodiment, relative to the package example in FIG. 15, a retail package includes an encoded signal redundantly provided over its surface. For example, the package may include redundant instances of digital watermarking carrying a GTIN number in each of the grid cells (or a subset of the grid cells). Preferably, the encoding (e.g., digital watermarking) is included on all sides of the package. The package also includes an icon 550, which indicates the presence of additional information associated with the package or package contents, e.g., online information. Icon 550 may be even located near a nutrition text box printed on the package (not shown in FIG. 15). A smartphone camera captures image data representing a portion of the package which includes i) the encoded signal, but not ii) icon 550. The image data is provided to the process detailed in FIG. 16A. In this scenario, the encoded signal is decoded but icon 550 is not detected, triggering a certain response (e.g., "Response 1" in FIG. 16A). Since icon 550 is not detected it can be assumed that there is not a current interest in the additional information. Therefore, the response may include providing access to the GTIN information, or product information associated with the GTIN.

The algorithms, processes, image capture and functionality shown in FIGS. 16A and 16B can be carried out on a portable or mobile device, e.g., a smartphone, tablet, smart glasses, or laptop, e.g., as discussed below with respect to FIG. 19. Signal Decoder 502 can include, e.g., a digital watermark decoder such as disclosed in U.S. Pat. Nos. 6,102,403, 6,614,914, 9,117,268, 9,245,308 and/or 9,380, 186, and US Publication Nos. 20160217547 and/or 20160275639, which are each hereby incorporated by reference in its entirety. Other decoders suitable for inclusion in Signal Decoder 502 may include, e.g., a 1D or 2D barcode decoder. One example of a suitable 1D and 2D barcode detector is ZXing ("Zebra Crossing"), which is an open-source, multi-format 1D/2D barcode image processing library implemented in Java, with ports to other languages, found at currently at https://github.com//xingizxhig.

Various implementations of Icon Detector 504 are discussed further with reference to FIGS. 17A-17C.

In FIG. 17A, Image Data 500 is provided so that potential icon candidates can be identified 520. For example, 520 may identify many different image areas with characteristics that may be associated with icon 550. Identified candidates are passed on for processing 530 to determine whether they represent an icon, e.g., icon 550 in FIG. 15.

Let's look under the hood with reference to FIG. 17B and FIG. 17C.

Image data 500 can be filtered 520 for smoothing or to remove noise. For example, a bilateral filter can be employed to remove noise from the image data 500. A bilateral filter may be viewed, e.g., as a weighted average of pixels, which takes into account the variation of pixel intensities to preserve edges. See, e.g., Paris, et al., "A gentle introduction to bilateral filtering and its applications," Proceedings of SIGGRAPH '08 ACM SIGGRAPH, article no. 1, Aug. 11, 2008, which is hereby incorporated herein by reference. Edge detection 521 can be performed on the filter image data. For example, the Canny edge detector can be used. See, e.g., J. Canny (1986) "A computational approach to edge detection", IEEE Trans. Pattern Analysis and Machine Intelligence, vol. 8, pages 679-714, which is hereby incorporated herein by reference. The Canny-Deriche detector is another filter that could be used. See, e.g., R. Deriche (1987) Using Canny's criteria to derive an optimal edge detector recursively implemented, Int. J. Computer Vision, vol. 1, pages 167-187, which is hereby incorporated herein by reference. Or the Log Gabor filter could be used instead of or in combination with the above mentioned filters. See, e.g., Sylvain Fischer, Rafael Redondo, Laurent Perrinet, Gabriel Cristobal, "Sparse approximation of images inspired from the functional architecture of the primary visual areas," EURASIP Journal on Advances in Signal Processing, special issue on Image Perception, 2007. Yet another edge detector is the Sobel Edge detector, e.g., which is discussed in Gao et al. "An improved Sobel edge detection." Computer Science and Information Technology (ICCSIT), 2010 3rd IEEE International Conference on. Vol. 5. IEEE, 2010, which is hereby incorporated herein by reference in its entirety.

For all (or a subset of) contours 522 identified by the edge detector 521, it can be determined whether various criteria is met. This criteria can be determined based on the physical properties of icon 550. For example, consider an icon that is somewhat hexagonal in shape. The criteria for such an icon may include whether a contour is, e.g., a "closed contour" 523, has a pixel size or area within predetermined limits 524 (e.g., to weed out too large and too small of areas), is convex 525, and has the correct number of sides (e.g., at least 6 if looking for a hexagonal shaped icon, or at least n sides if looking for an n-sided polygon) 526. All contours (or a subset of those meeting predetermined criteria, e.g., exactly 6 sides, within a certain size, etc.) meeting these criterion (523, 524, 525 and/or 526) can be passed to a second stage for further analysis or identified as candidate contours 528. Otherwise, contours not meeting these criterion can be discarded 527. Of course, not all of the criterion need to be met. For example, candidate contours can be identified based on successfully meeting 3 out of the 4 criterion.

Determined candidate contour(s) can analyzed in a second stage (FIG. 17C) to determine whether it corresponds to icon 550. For example, we can use a template based approach to determine whether a candidate contour (e.g., including image data enclosed within the candidate contour) matches a template based on icon 550. An area associated with the candidate contour can be assessed. For example, a minimum bounding box can be drawn around the candidate contour. For example, the techniques described in O'Rourke, Joseph (1985), "Finding minimal enclosing boxes", International Journal of Computer and Information Sciences, 14 (3): 183-199, which is hereby incorporated herein by reference, can be used. Additionally, a minimum bounding box can be generated in software, e.g., such as various scripts for in MatLab from MathWorks (fx minBoundingBox(X), which computes the minimum bounding box of a set of 2D points, and where the input includes [x,y] coordinates corresponding to points on a candidate contour). An example open source MatLab bounding box script is shown for minBoundingBox(X) in FIGS. 18A and 18B.

The minimum bounding box helps facilitate re-orientation 532 of the candidate contour to resolve image rotation and scale. For example, the bounding box (and its image contents) can be rotated such that one of its edges is horizontal to an image plane. And the image data within the candidate contour can be resized, e.g., according to the sizing of previously stored templates.

The candidate contour (e.g., including image content represented within the contour) may be binarized 533, e.g., if later stage matching templates are provided in binary form. Next is template correlation 534. Here, a correlation is determined between the processed candidate contour and the matching template(s). Since we propose using a minimum bounding box, and since at least one edge of that box is preferably reoriented to a horizontal line, we suggest using four (4) templates per candidate contour (one representing 0° rotation, one representing 90° rotation, one representing 180° rotation, and one representing 270° rotation). Using four (4) templates is useful since the potential icon could be variously oriented within the minimum bounding box. One of the four different rotation angles should be a good approximation, e.g., due to bounding box re-orientation 532. Of course, additional templates at additional angles can be used, e.g., but at an efficiency cost. The templates are based on a target icon (e.g., icon 550) and can be binarized to cut back on processing time. In one correlation example, the template and the candidate contour are compared on a pixel-by-pixel basis. A multiplication (or AND) operation can be carried out for each template pixel and its corresponding candidate pixel. For example, if the template pixel value is a binary 1 but the candidate contour pixel value is a 0, then the resulting operation yields a 0. But, if the template pixel value is a binary 1 and the candidate contour pixel value is a 1, then the resulting operation yields a 1. The value of pixel operations can be summed, yielding a result. A higher value can be used to indicate a close match. The results can be normalized 535 to aid in determining a match 538. In another embodiment, we use a cross-correlation or convolution operation to identify a match with a target icon. In still another embodiment we use a correlation coefficient, e.g., Pearson's correlation coefficient (r). For monochrome images, image 1 and image 2, the Pearson correlation coefficient is defined as:

$$r = \frac{\sum_i (x_i - x_m)(y_i - y_m)}{\sqrt{\sum_i (x_i - x_m)^2} \sqrt{\sum_i (y_i - y_m)^2}}$$

where $x_i$ is the intensity of the ith pixel in image 1, $y_i$ is the intensity of the ith pixel in image 2, $x_m$ is the mean intensity of image 1, and $y_m$ is the mean intensity of image 2. The correlation coefficient has the value r=1 if the two images are identical, r=0 if they are uncorrelated, and r=−1 if they are anti-correlated, for example, if one image is the negative of the other. See, e.g., J. L. Rodgers, J. L. and W. A. Nicewander, "Thirteen Ways to Look at the Correlation Coefficient", American Statistician 42, 59-66 (1995), which is hereby incorporated herein by reference in its entirety. Here again correlation results can be optionally normalized 535 to determine whether the candidate contour matches 538 the icon.

Further embodiments for icon detection are discussed below with reference to FIGS. 20A-20E.

Figure 20A:
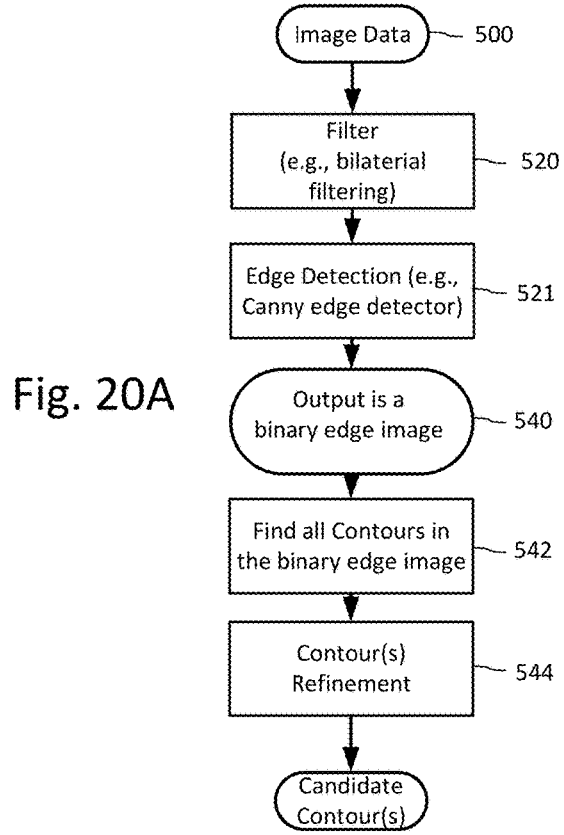
FIG. 20A is a flow diagram for a process to detect candidate contours within image data.

Candidate contour selection proceeds with reference to FIG. 20A. Image data 500 is obtained from a portable device, e.g., a smartphone, such as discussed below in FIG. 19. We prefer to use greyscale imagery as discussed above with reference to FIGS. 17A-17C. But, as mentioned above, other representations of the image data could alternatively be used. The image data 500 is filtered 520, e.g., using a bilateral filter. Such a filter preferably preserves edges while smoothing (or removing noise from the image data 500). Edge Detection is carried out at 521, e.g., using a Canny edge detector or other edge detector as discussed above. The output of the edge detector is preferably a binary image 540 representing the edges in image data 500. Contours within the binary edge image are identified in 542. For example, so-called blob detection (alternatively called "connected component labeling") can be used. See, e.g., Dillencourt et al., "A general approach to connected-component labeling for arbitrary image representations," Journal of the ACM. J. ACM. 39 (2): 253 (1992), which is hereby incorporated herein by reference. A "connected component labeling" process, e.g., may initially label pixels (e.g., assigns a value to each pixel). For example, all pixels that are connected to each other can be given the same value or linked together (e.g., a linked list of pixels). Pixels can be clustered based on their connectivity to other pixels (or based on assigned values). Such clusters can be used as (or as a proxy for)

contours. Once contours are identified, they can be refined 544 to determine whether they are suitable candidates for further analysis.

Figure 20B:
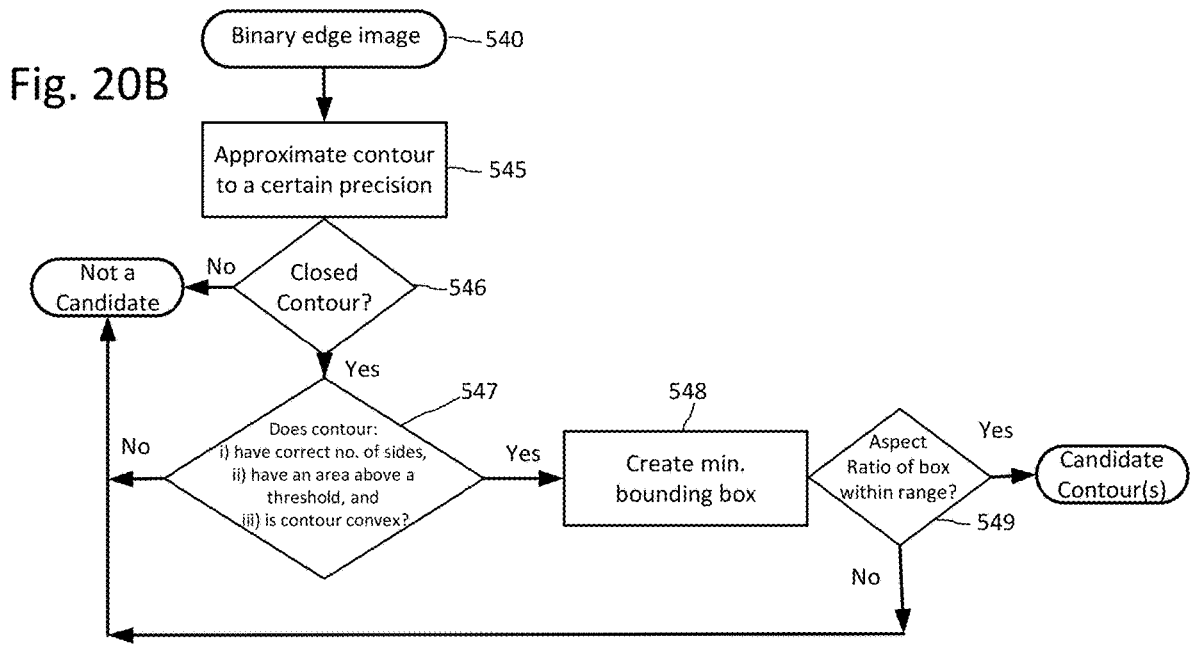
FIG. 20B is a flow diagram showing one embodiment of contour refinement.

FIG. 20B explores an embodiment of the contour refinement 544.

Using the binary edge image 540, one or more of the contours are approximated with certain precision 545. (This 545 process can be substituted for process 542 in FIG. 20A.) Given a contour, a number of points representing the contour is reduced. In one example, a number of points is reduced such that straight lines between the points yields a suitable approximation of the contour. Suitable in this example means that the fit error (or distance error) between a contour segment and its representative straight line fall within a predetermined threshold. In another example, a predetermined number of points are used to represent the contour. It is then determined whether the contour is a closed contour 546. If not, the process stops for that particular contour, and a next contour, if available, is analyzed. Of course, this feature 546 can be integrated into the feature 545. If the contour is closed, it is further evaluated in 547. There, it is determined whether the closed contour has: i) at least n-number of sides, where n is an integer, ii) an area above a minimum threshold area, and if iii) the contour is convex. (Instead of having each of these three criteria resulting in a single decision, they can be broken into 2 or 3 individual decisions.) If all of these criteria are met, flow continues to 548. If not, that particular closed contour is discarded.

A minimum bounding box is calculated around the closed contour, e.g., as discussed above with reference to FIG. 17B, item 531. The minimum bounding box can then be evaluated 549, e.g., to determine whether its aspect ratio is within a certain range. For example, since a square has equal sides, its aspect ratio is 1. A 4:3 rectangle, on the other hand, has an aspect ratio of 1.33 (4/3). A suitable aspect ratio range can be established, e.g., based on a particular icon for evaluation. By way of example, for a SmartLabel icon, we prefer an aspect ratio of 0.4-2.5. If the bounding box aspect ratio is not within a predetermined range, the closed contour is not a candidate. If it is within the predetermined range, the contour is identified as a potential candidate contour.

Figures 20C, 20E:
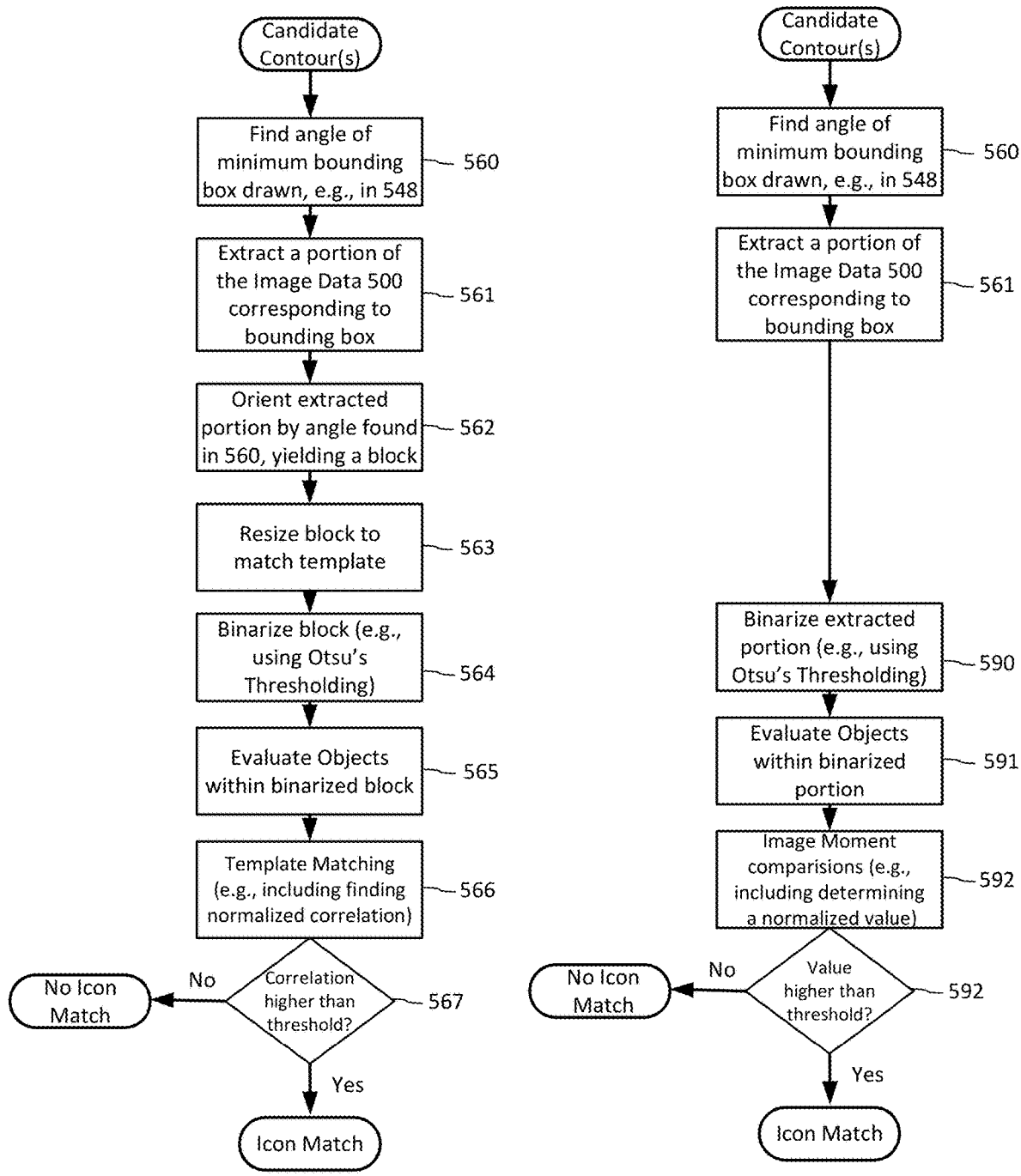
FIG. 20C is a flow diagram for icon matching of candidate contours.
FIG. 20E is yet another flow diagram for icon matching of candidate contours.

One embodiment of how to determine whether a candidate contour is a match with a particular icon is discussed with reference to FIG. 20C.

A set of candidate contours is determined or obtained, e.g., by one or more of the processes discussed with reference to FIG. 17A, 17B, 20A or 20B. The order of which to evaluate candidates within the set of candidates can be determined, e.g., based on a first in—first out process or first in—last out process. In another example, the aspect ratio determined in FIG. 20B, item 549, can be used to rank candidate contours. For example, if a target icon has an aspect ratio near 1, candidate contours can be ranked according to their determined aspect ratios, with the closest aspect ratio to 1 being evaluated first, and the second closest being evaluated next, and then so on. In another example, the candidate contours are ranked according to their minimum bounding box area (or an area calculated for the closed contour), with the largest area first, and the smallest area last.

Figure 21:
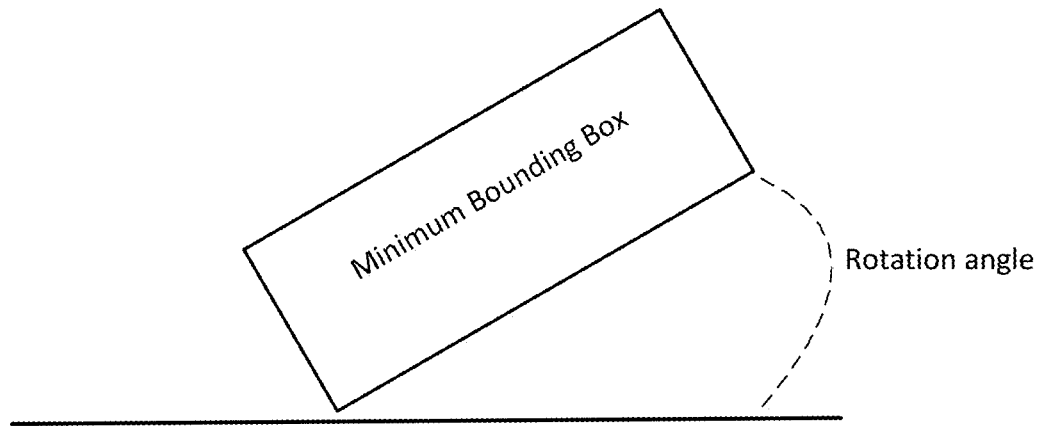
FIG. 21 shows a rotation angle for a minimum bounding box.

For a first candidate contour, an angle of rotation (see FIG. 21) is found 560 for the minimum bounding box found in 548. A portion of image data 500 is extracted or obtained 561 that corresponds to the area bounded by the minimum bounding box. For example, the corresponding pixels that are within the area (e.g., the corresponding spatial locations) identified by the minimum bounding box are obtained for further evaluation. In our preferred approach, however, image data 500 after filtering by 520 is obtained or extracted which corresponds to the area (e.g., the corresponding spatial locations) of the minimum bounding box. The extracted or obtained image data (or filtered image data) is then oriented 562 (e.g., rotated) according to the rotation angle identified in 561. We refer to this rotated, extracted image data (or filtered image data) as a "block." This orientation process helps the icon matching be more rotation invariant relative to an un-rotated block. The block can then be resized 563 to match or approximate the size of the template(s).

The image content within the block is then binarized 564, e.g., using Otsu's thresholding. See Nobuyuki Otsu (1979), "A threshold selection method from gray-level histograms," IEEE Trans. Sys., Man., Cyber. 9 (1): 62-66, which is hereby incorporated herein by reference. Otsu's thresholding assumes that an image contains two classes of pixels following a bi-modal histogram (e.g., foreground pixels and background pixels), it then calculates an optimum threshold separating the two classes so that their combined spread (e.g., intra-class variance) is minimal, or equivalently (e.g., because the sum of pairwise squared distances is constant), so that their inter-class variance is maximal. Of course, feature 564 could be combined with the resizing process in 563.

Figures 22A, 22B:
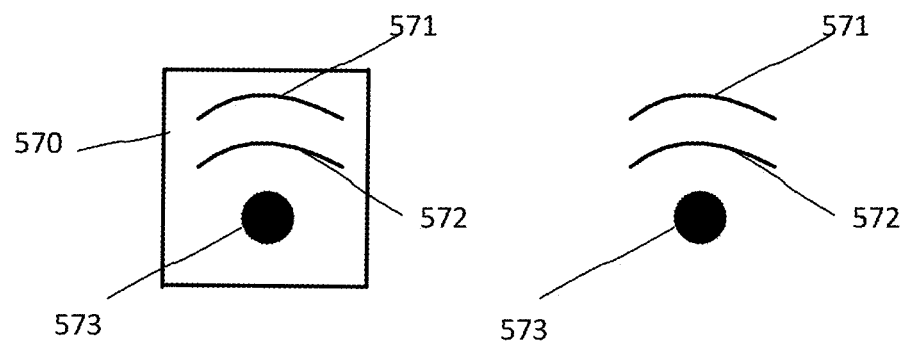
FIGS. 22A and 22B show object evaluation within a block.
Figure 22C:
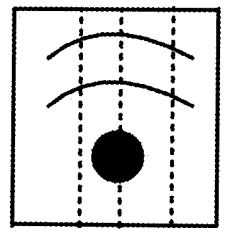
FIG. 22C shows lines through a block which includes objects.

Objects within the binarized block can be evaluated in 565. For example, an area associated with each object can be determined. With reference to FIG. 22A, 4 objects 570, 571, 572, 573 are associated with a particular binarized block. A threshold area can be set, e.g., either to discard objects with an associate area that is either too large or too small. For example, in the case of a SmartLabel icon, objects with an area larger than, e.g., a value between 12-25% of the binarized block, can be discarded. So, in this particular example, object 570 is the only object in FIG. 22A that needs to be discarded, with the remaining objects shown in FIG. 22B. In particular, we currently prefer discarding objects with an area more than 17% of the block area. An alternative evaluation technique looks for an expected pattern. For example, virtual lines can be drawn (or pixels along a virtual line can be evaluated) through a block. A pattern or ratio of on and off pixels along the line(s) can be evaluate to determine whether it meets a threshold level, pattern or ratio. For example, the left and right dashed lines in FIG. 22C only cross through objects 571 and 572, but not object 573. The middle dashed line crosses through all three objects 571, 572 and 573. The middle line is likely to meet the predetermined threshold of on off pixel threshold, pattern or ratio, for this particular example, while the left and right lines would not. (This same pattern or ratio process could be used as an initial filter, e.g., after filtering 520 or edge detection 521 to do a rough check whether an expected pattern or ratio associated with an icon is present in the image data 500.)

Template matching 566, e.g., including a normalized correlation, is carried out for the processed block. For example, the template correlation and normalizing processes discussed above with respect to 534 and 535 can be carried out. If a normalized correlation value is higher than a predetermined threshold 567, the candidate contour is accepted as a match to the target icon. If not, the candidate contour is not a match. Additional candidate contours can be evaluated according to the FIG. 20C processes if no match is found. And, unless multiple icons are being searched for, the processes need not evaluate additional candidates once an icon match is found.

It should be noted that different resizing 563 can be tried per candidate contour, which would provide better scale invariance relative to a single resizing. For example, image data 500 can be resized at different scales and then evaluated according to 564-567.

Figures 18B, 20D:
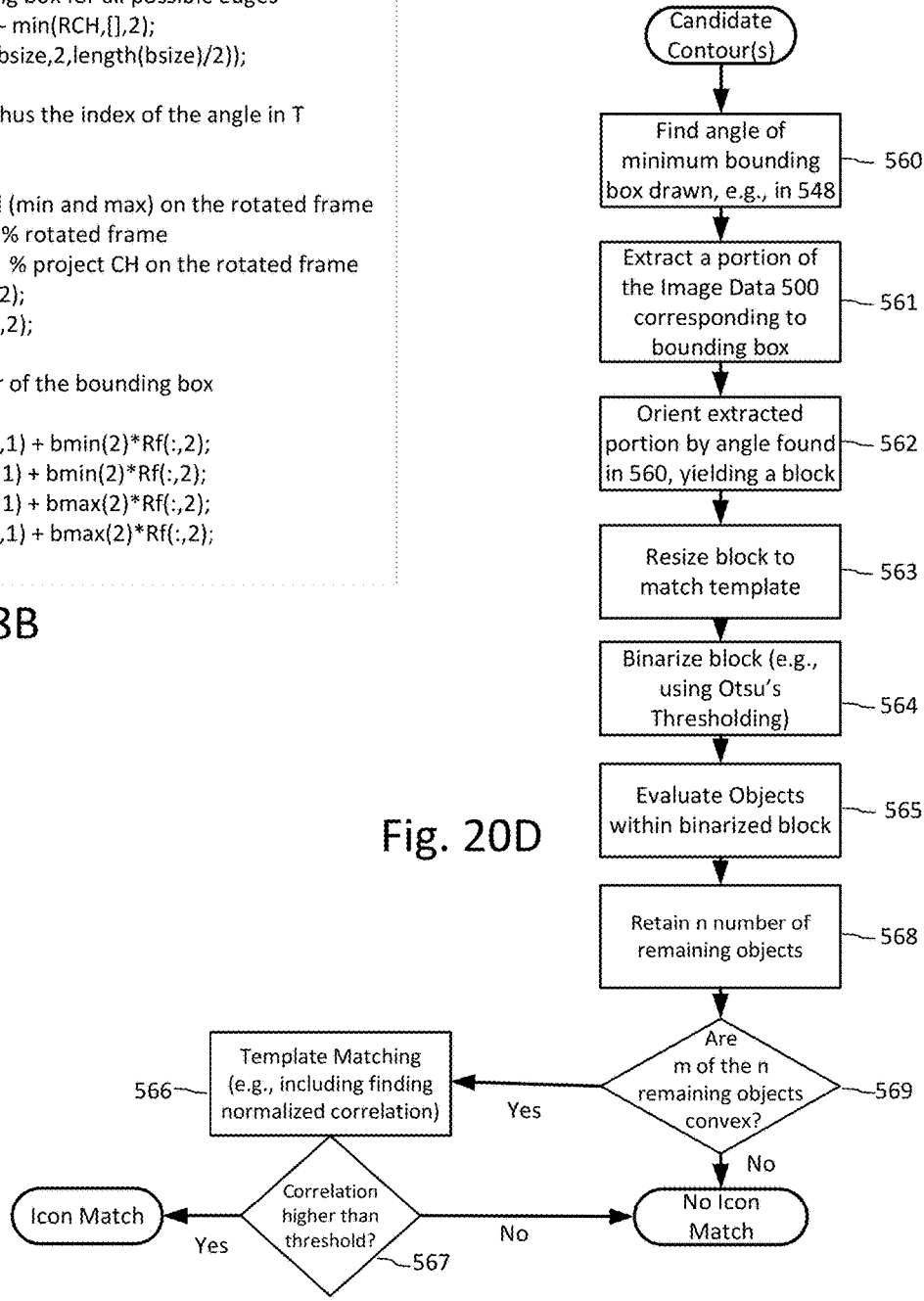

Another embodiment of how to determine whether a candidate contour is a match with a particular icon is discussed with reference to FIG. 20D.

Figures 23A, 23B:
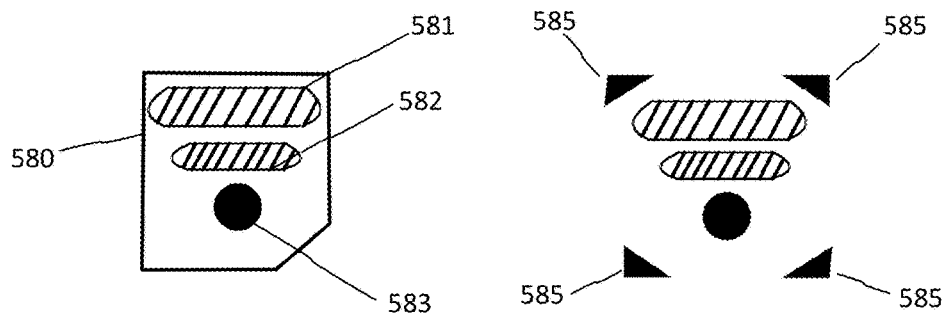
FIGS. 23A, 23B and 23C show object evaluation within a block.
Figure 23C:
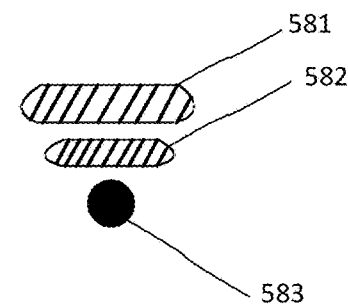

Image processing flow proceeds through operations 560-565 as discussed above with respect to FIG. 20C. A subset of remaining objects to retain is determined at 568. For example, and with reference to FIGS. 23A-23C, a resized block (after 563) is shown in FIG. 23A. The block includes objects 580, 581, 582 and 583. Binarization 564 and Evaluation 565 may yield the remaining objects shown in FIG. 23B, including objects 585. These objects 585, e.g., maybe binarization artifacts associated with corners or other object structures. It would be good to remove these objects prior to template correlation. In 568 a subset of remaining objects to retain is determined, e.g., by only keeping the largest sized n number of objects, where n is an integer. For example, and again with reference to FIG. 23B, if we are looking for a target icon including objects 581, 582 and 583 (but not objects 585) then we can prune the number of objects to the 3 largest remaining objects (581, 582, 583). The term "sized" (or size) in this context can be determined by, e.g., an object's spatial area or by an object's length of perimeter. The remaining objects are shown in FIG. 23C. (Items 581 and 582 are drawn with cross-hatching. This is intended to represent that these objects could either be dark or light objects, or a combination of such.) The integer n can be increased or decreased depending on the number of objects expected in a target icon.

Figures 24A, 24B:
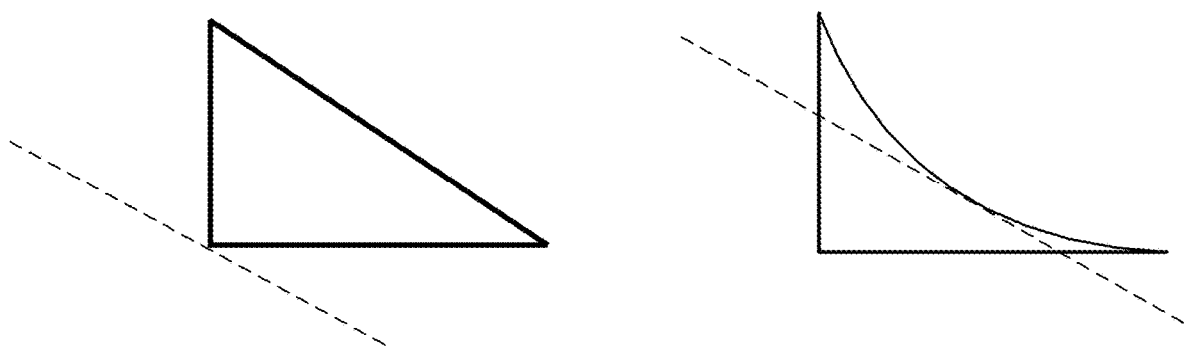
FIG. 24A shows objects including tangent lines.
FIG. 24B shows other objects including tangent lines.

Next, it can be determined whether m of the n number of remaining objects are convex 569, where m and n are each integers. In this context, convex implies that any tangent to a shape will result in the object's interior only being on one side of the tangent, e.g., as shown in FIG. 24A. A concave shape, in contrast, would have a potential tangent resulting in portions of the shape falling on both sides of the tangent line, e.g., as shown in FIG. 24B. (It should be noted, however, that if an icon included a concave shape, we could alternatively determine whether m of the n number of remaining objects were concave.) In the illustrated example (FIG. 23C), we may decide that m=2, or if a lower false positive is required, then m=3. If the number of remaining objects is equal to (or greater than) m, flow moves on to template correlation 566 and comparison with threshold 567 as discussed above with reference to FIG. 20C. If not, it is determined that the candidate does not match the target icon.

Another embodiment of how to determine whether a candidate contour is a match with a particular icon is discussed with reference to FIG. 20E, where shape matching utilizing so-called "image moments" is employed.

Image processing flow proceeds through operations 560-561 as discussed above with respect to FIG. 20C. Omitted, however is operations 562 and 563 relative to FIG. 20C. This is because an image moment shape matching operation typically extracts rotationally and scale invariant candidate features from an image portion. Flow moves on to operations 590 and 591, which are essentially the same as operations 564 and 565 in FIG. 20C, respectfully. Different reference numbers are used in FIG. 20C vs. FIG. 20E since the terms "image portion" are used in FIG. 20E instead using "block" as in FIG. 20C. But, the two terms can be used interchangeably, however, since they both represent image data from a certain spatial image area. Flow continues to operation 592, where image moments of shapes from the binarized, evaluated image portion are compared to image moments of one or more shapes in a target icon. For example, and with reference to FIG. 23C, three (3) shapes 581, 582 and 583 are intended to be matched in a target icon. Image moments for each of these shapes can be determined and stored as references. Then, moments from an image portion can be determined and compared against the references. The comparisons can be normalized and then compared against a predetermined threshold. If the nominalized comparison exceeds the threshold (or is lower than if a perfect match is a zero (0)), then the icon matches the target icon. If not, no icon is detected.

Image moments are discussed, e.g., in Jan Flusser, Tomáš Suk and Barbara Zitová, "Moments and Moment Invariants in Pattern Recognition," 2009 John Wiley & Sons, Ltd. ISBN: 978-0-470-69987-4, which is incorporated herein by reference. Early work in the field included Hu's seven moments, e.g., see Hu, M. K.: Visual Pattern Recognition by Moment Invariants. IRE Trans. Inform. Theory 1(8) (February 1962) 179-187, hereby incorporated herein by reference in its entirety.

Another check can be added to the processes discusses above with respect to FIG. 17A-FIG. 17C and FIGS. 20A-20D. If one of the expected objects includes a circularly shaped object, e.g., items 573 or 583, we can introduce a circularity check. In this cases, since we know that at least one of the objects in an icon includes a circle, we may check for circularity by: (Perimeter_Object^2)/(4*n*Area_Object) and comparing this value to a threshold range. An ideal circle this ratio should be equal to 1. We preferably accept a circularity check as falling with a threshold range of 0.5-1.5, and even more preferably between 0.7-1.3. So, if at least one object within a potential candidate does not have a circularity check falling within a predetermined threshold range, we disregard that that candidate in cases where a target icon is expected to include a circular object. This check can make the determination even more robust to false positives.

As an alternative arrangement, an icon (e.g., icon 550) may include a machine-readable code encoded therein or there around. Detection of the machine-readable code triggers a response associated with the icon. In this example, instead of detection of the icon+encoded signal, the detection of the machine-readable code, alone, triggers the response associated with the icon. As a further alternative, detection of the machine-readable code+an encoded signal triggers the response associate with the icon.

In still another implementation, the encoded signal includes a plural-bit payload. The plural-bit payload has at least one bit (e.g., a "trigger bit") that can be set to indicate the presence of information associated with an icon or with a package. The remaining portion of the payload may including, e.g., a GTIN or UPC number. A signal decoder, upon a successful decode of a payload including a trigger bit provides access to (or indicates to a software app to provide access to) information associated with the icon.

Operating Environment

The components and operations of the various described embodiments shown in FIGS. 15-17C and 20A-20E can be implemented in modules. Notwithstanding any specific discussion of the embodiments set forth herein, the term "module" may refer to software, firmware and/or circuitry configured to perform any of the methods, processes, algorithms, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, and assembled in executable binary files, etc., in conjunction with associated data. Firmware may be embodied as code, instructions or instruction sets or data that are hard-coded (e.g., non-volatile) in memory devices. As used herein, the term "circuitry" may include, for example, singly or in any combination, hardwired circuitry, programmable circuitry such as one or more computer processors comprising one or more individual instruction processing cores, parallel processors, state machine circuitry, or firmware that stores instructions executed by programmable circuitry.

Applicant's work also includes taking the scientific principles and natural laws on which the present technology rests, and tying them down in particularly defined implementations. For example, the implementations discussed with reference to FIGS. 15-17C and FIGS. 20A-20E. One such realization of such implementations is electronic circuitry that has been custom-designed and manufactured to perform some or all of the component acts, as an application specific integrated circuit (ASIC).

To realize such implementations, some or all of the technology is first implemented using a general purpose computer, using software such as MatLab (from Math-Works, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.) Another specific implementation of the present disclosure includes barcode and/or encoded signal detection operating on a specifically configured smartphone (e.g., iPhone 7 or Android device) or other mobile device, such phone or device. The smartphone or mobile device may be configured and controlled by software (e.g., an App or operating system) resident on the smartphone device. The resident software may include, e.g., a barcode decoder, digital watermark detector and detectability measure generator module.

For the sake of further illustration, FIG. 19 is a diagram of a portable electronic device (e.g., a smartphone, mobile device, tablet, laptop, wearable or other electronic device) in which the components of the above processes (e.g., those in FIGS. 16-17C and 20A-20E) may be implemented. The following reference numbers refer to FIG. 19, and not any of the other drawings, unless expressly noted.

Referring to FIG. 19, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 19 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, multi-core microprocessor, parallel processors, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). Another CPU example is an Apple A10, A8 or A7. By way of further example, the A8 is built on a 64-bit architecture, includes a motion co-processor and is manufactured on a 20 nm process. The CPU 102 runs an operating system of the electronic device, runs application programs (e.g., mobile apps such as those available through application distribution platforms such as the Apple App Store, Google Play, etc., or custom designed to include signal decoding and icon detection) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. Encoded signal decoding and icon detection capabilities can be integrated into the operating system itself.

The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104.

The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, an illumination source such as a flash or torch, a buzzer, a haptic actuator, a loud speaker, or the like or any combination thereof. In the case of an iPhone 6, the flash includes a True Tone flash including a dual-color or dual-temperature flash that has each color firing at varying intensities based on a scene to make sure colors and skin tone stay true.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, flexo-printing, offset printing, embossing, laser marking, etc. The printer may also include a digital press such as HP's indigo press. An encoded object may include, e.g., a consumer packaged product, a label, a sticker, a logo, a driver's license, a passport or other identification document, etc. Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. Such imagery may correspond with image data 500 as shown in FIGS. 16, 17A, 17B and/or 20A. General functions typically performed by the ISP 116 can include Bayer transformation, demosaicing, noise reduction, image sharpening, filtering, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker. GPU 118 may also be configured to serve one or more functions of a signal decoder. In some cases GPU 118 is involved in encoded signal decoding (e.g., FIGS. 16A and 16B, 502), while icon detection (FIGS. 16A and 16B, 506) is performed by the CPU 102. In other implementations, GPU 118 performs both signal detection 502 (FIGS. 16A and 16B) and Icon detection 506 (FIGS. 16A and 16B). In some cases, Icon Detector 506 (FIGS. 16A and 16B) is incorporated into Signal Decoder 502 (FIGS. 16A and 16B), which may execute by CPU 102, GPU 118 or on a processing core.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensor(s) 132. Sensor 132 can, for example, include an accelerometer (e.g., for sensing acceleration, orientation, vibration, etc.), a magnetometer (e.g., for sensing the direction of a magnetic field), a gyroscope (e.g., for tracking rotation, orientation, or twist), a barometer (e.g., for sensing air pressure, from which relative elevation can be determined), a wind meter, a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 8, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the US Patents and Patent Applications ("patent documents") referenced above. Each of the above patent documents is incorporated herein in its entirety, including all drawings and any appendices, even if the patent documents are only referenced to specific portions thereof.

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
obtaining image data associated with one or more plural image frames, the one or more image frames depicting a physical object, the plural image frames captured with a camera;
using one or more processors, first analyzing the image data, in which said first analyzing analyzes image data to detect presence of an icon;
and once the icon is detected, and using the one or more processors, second analyzing the image data at or around a spatial location associated with the detected icon to decode a signal encoded within the image data, and inclusively expanding the spatial location from two to four inches associated with the detected icon since the second analyzing does not decode the signal, and analyzing image data associated with the expanded spatial location to decode the signal encoded within the image data;
providing a first response when the presence of the icon is detected but the signal is not decoded; and
providing a second, different response when the icon is detected and the signal is decoded.

2. The method of claim 1 wherein the signal is encoded with digital watermarking.

3. The method of claim 1 wherein the signal carries a plural-bit payload, and the signal is encoded within or on the icon.

4. The method of claim 1 wherein the signal carries a plural-bit payload, and wherein the second, different response comprises providing access to remotely located information associated with the detected icon, while preventing access to the plural-bit payload by a smartphone operation not associated with the providing access.

5. The method of claim 1 wherein the signal carries a plural-bit payload, and the signal is encoded in an area surrounding the detected icon, the area comprising 1/300 to 2 inches squared on all sides of the icon.

6. The method of claim 1 in which the second analyzing comprises analyzing a subset of the image data at or around a spatial location associated with the detected icon to decode the signal encoded within the image data.

7. A non-transitory computer readable medium comprising instructions stored thereon that, when executed by one or more processors, cause the one or more processors to perform:
obtaining image data associated with one or more plural image frames, the one or more plural image frames depicting a physical object, the one or more plural image frames captured with a camera;
first analyzing the image data, in which said first analyzing analyzes image data to detect presence of an icon;
and once the icon is detected, second analyzing the image data at or around a spatial location associated with the detected icon to decode a signal encoded within the image data, and inclusively expanding the spatial location from two to four inches associated with the detected icon if the second analyzing does not decode the signal, and analyzing image data associated with the expanded spatial location to decode the signal encoded within the image data;
providing a first response when the presence of the icon is detected but the signal is not decoded; and
providing a second, different response when the icon is detected and the signal is decoded.

8. The non-transitory computer readable medium of claim 7 wherein the signal is encoded with digital watermarking.

9. The non-transitory computer readable medium of claim 7 wherein the signal carries a plural-bit payload, and the signal is encoded within or on the icon.

10. The non-transitory computer readable medium of claim 7 wherein the signal carries a plural-bit payload, and wherein the second, different response comprises providing access to remotely located information associated with the detected icon, while preventing access to the plural-bit payload by a smartphone operation not associated with the providing access.

11. The non-transitory computer readable medium of claim 7 wherein the signal carries a plural-bit payload, and the signal is encoded in an area surrounding the detected icon, the area comprising 1/300 to 2 inches squared on all sides of the icon.

12. The non-transitory computer readable medium of claim 7 in which the second analyzing comprises analyzing a subset of the image data at or around a spatial location associated with the detected icon to decode the signal encoded within the image data.

13. A smartphone comprising
a camera;
memory storing image data associated with one or more plural image frames, the one or more image frames depicting a physical object, the plural image frames captured with said camera;
one or more processors, configured for:
detecting presence of an icon within the image data;
and once the icon is detected, searching around a spatial location associated with the detected icon to decode a signal encoded within the image data, and inclusively expanding the spatial location from two to four inches associated with the detected icon if the signal encoded within the image data is not decoded, and searching image data associated with the expanded spatial location to decode the signal encoded within the image data;
generating a first response when the presence of the icon is detected but the signal is not decoded; and
generating a second, different response when the icon is detected and the signal is decoded.

14. The smartphone of claim 13 wherein the signal is encoded with digital watermarking.

15. The smartphone of claim 13 wherein the signal carries a plural-bit payload, and the signal is encoded within or on the detected icon.

16. The smartphone of claim 13 wherein the signal carries a plural-bit payload, and wherein the second, different response comprises providing access to remotely located information associated with the detected icon, while preventing access to the plural-bit payload by a smartphone operation not associated with the providing access.

17. The smartphone of claim 13 wherein the signal carries a plural-bit payload, and the signal is encoded in an area surrounding the icon, the area comprising 1/300 to 2 inches squared on all sides of the detected icon.

18. The smartphone of claim 13 in which the second analyzing comprises analyzing a subset of the image data at or around a spatial location associated with the detected icon to decode the signal encoded within the image data.

* * * * *